Jan. 3, 1933.    J. W. CHAMBERLIN    1,893,398
DRY CLEANING MACHINE
Filed Oct. 24, 1932    13 Sheets-Sheet 4

INVENTOR.
John W. Chamberlin
BY
Tefft & Tefft
ATTY'S

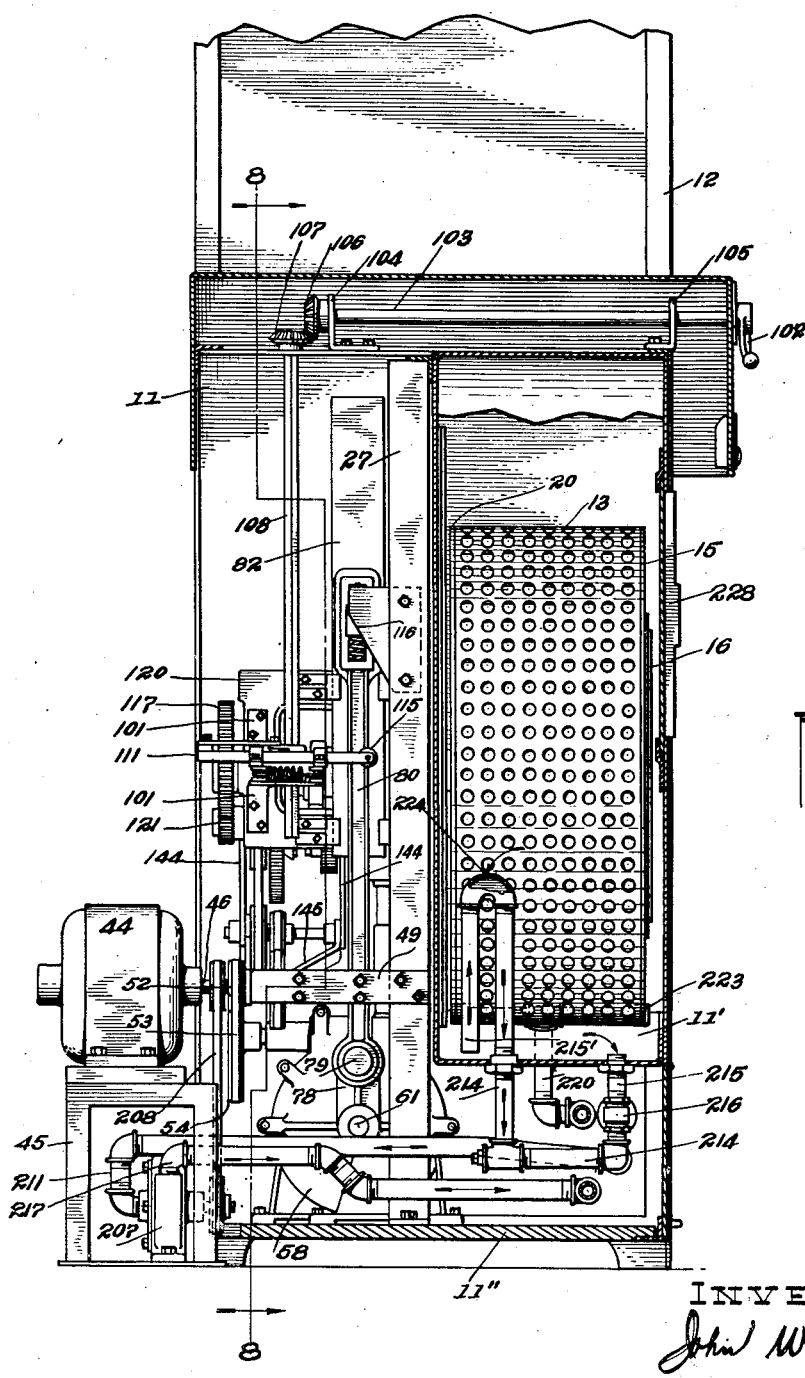

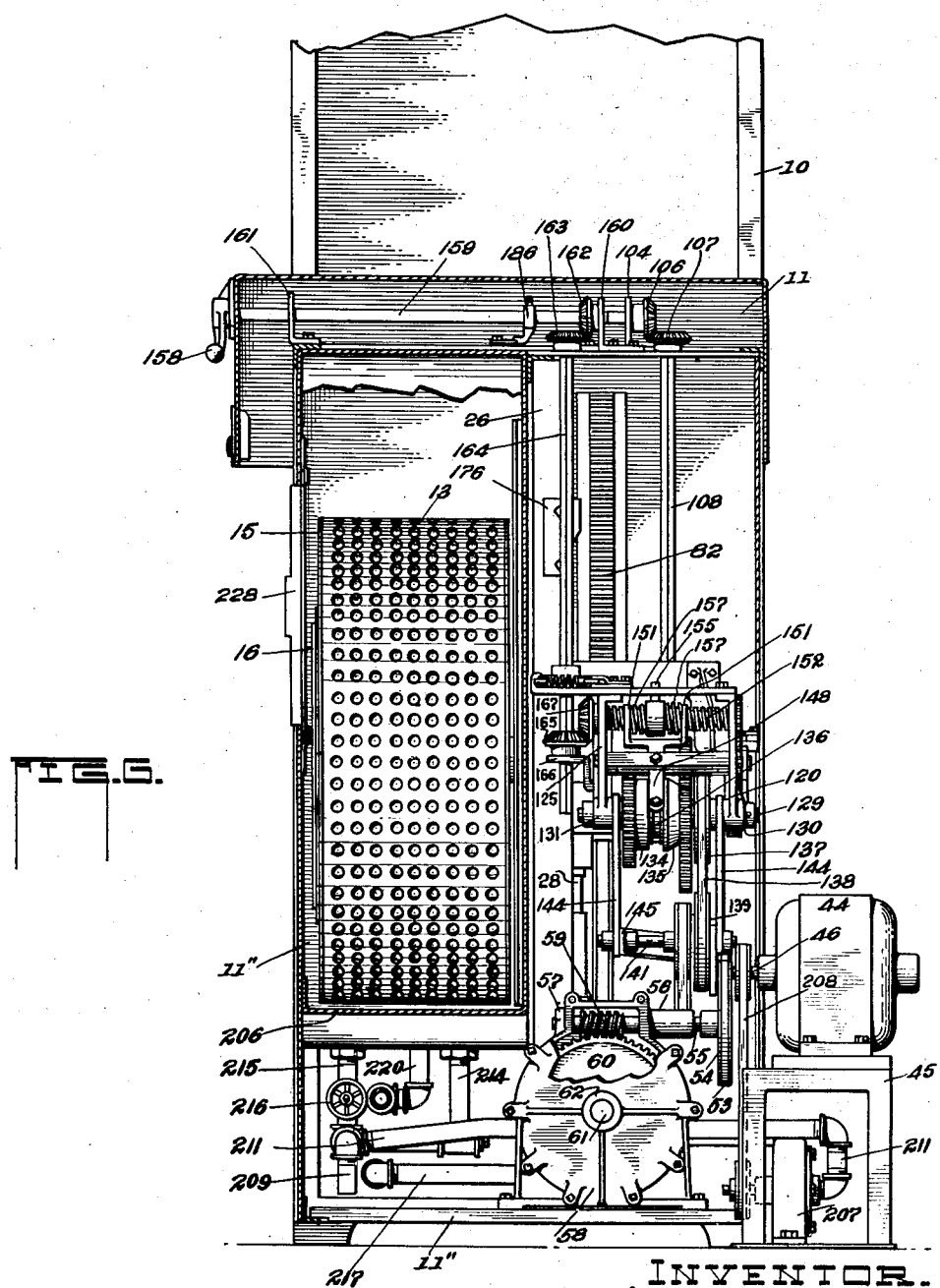

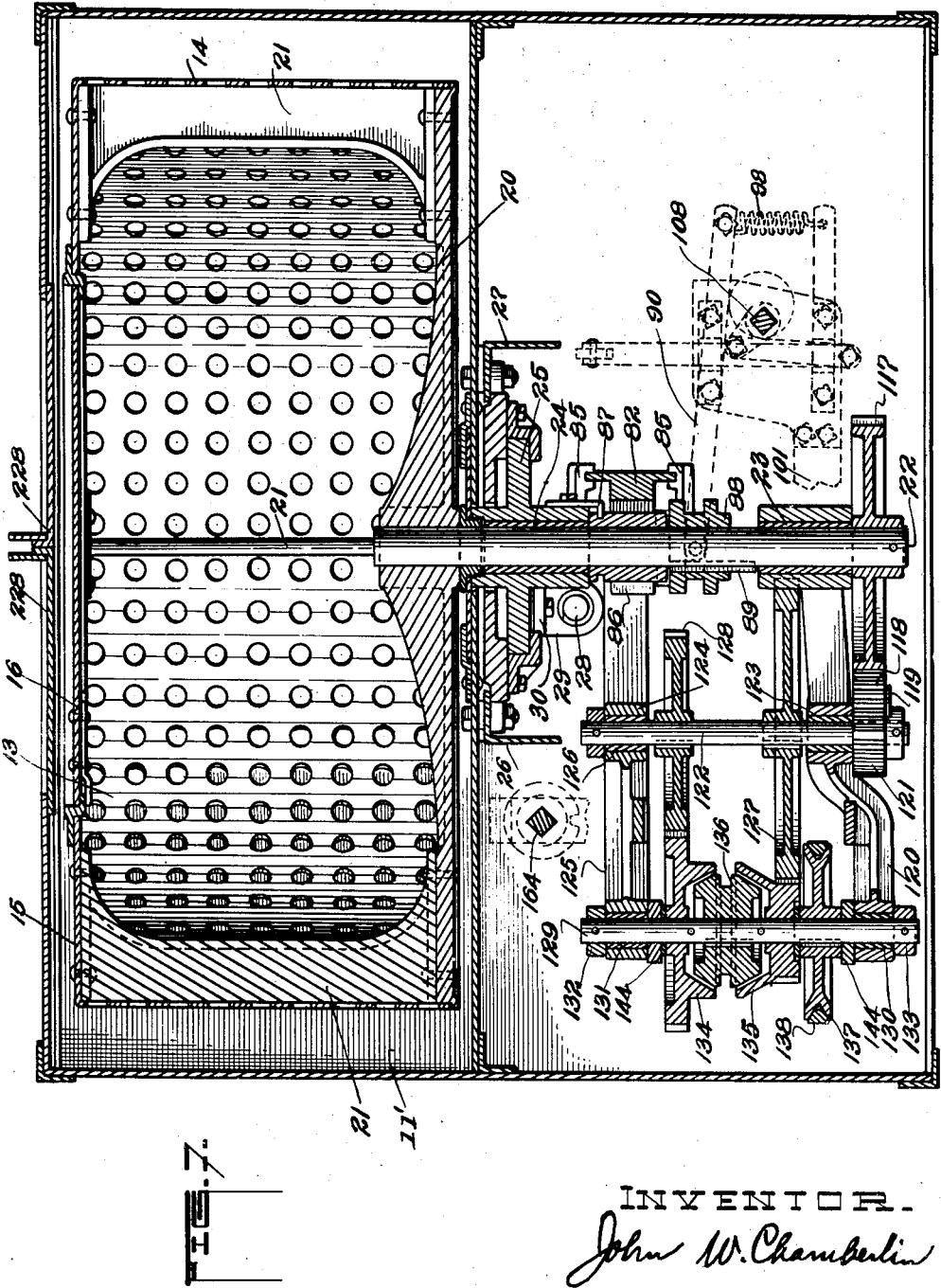

Jan. 3, 1933.  J. W. CHAMBERLIN  1,893,398
DRY CLEANING MACHINE
Filed Oct. 24, 1932  13 Sheets-Sheet 8
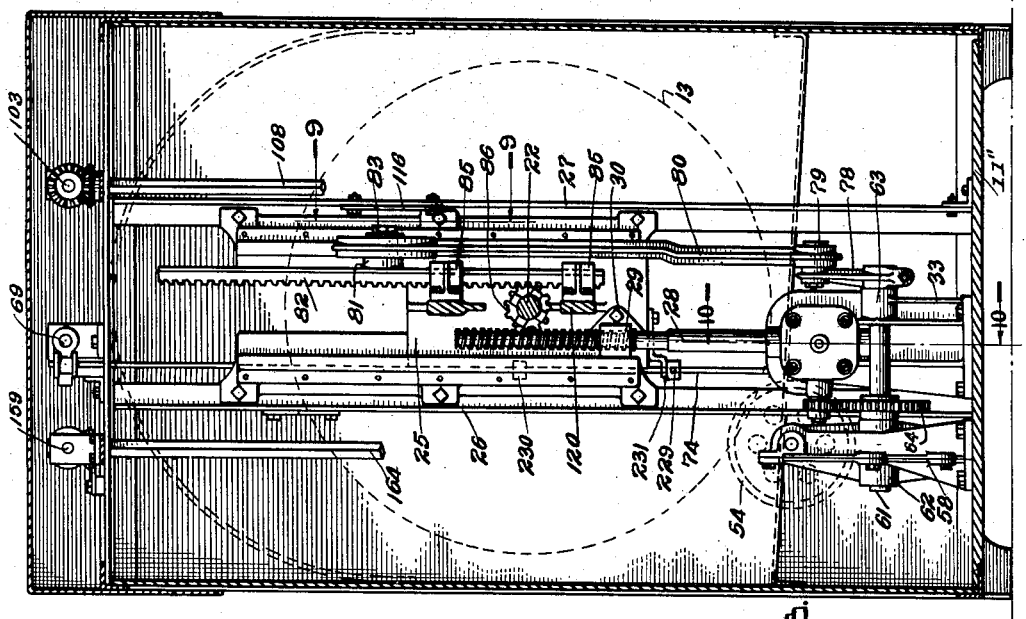
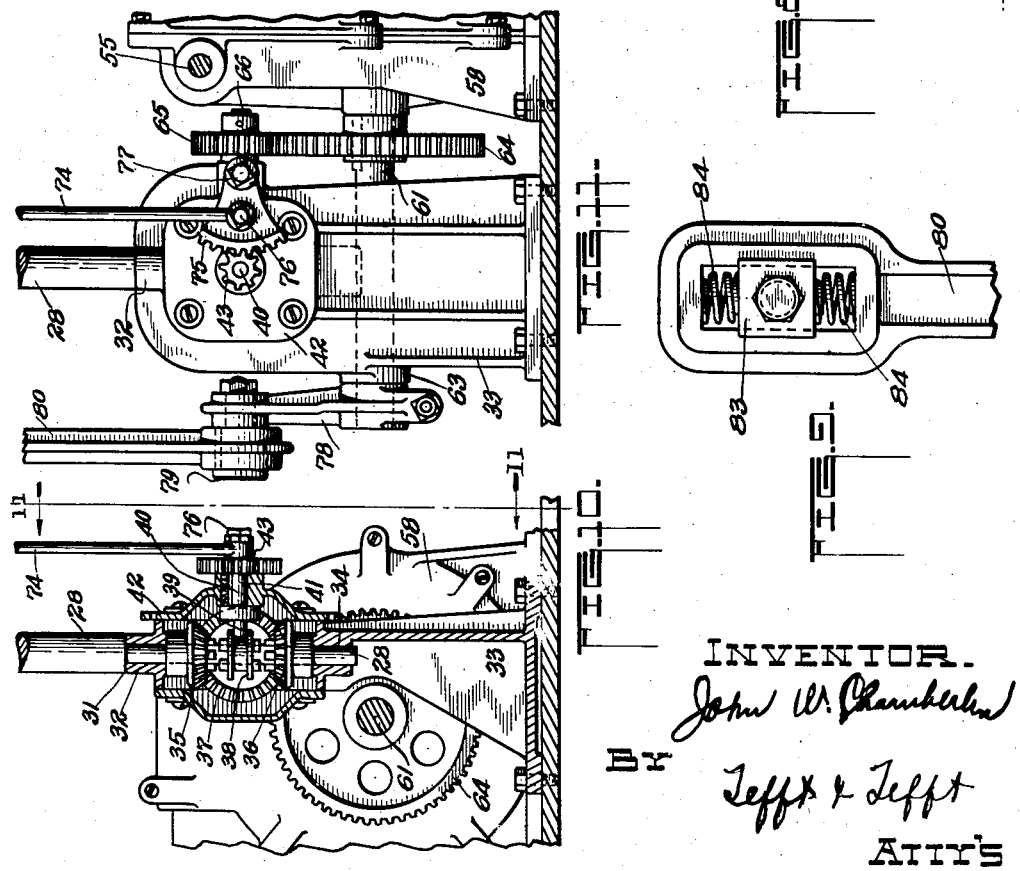

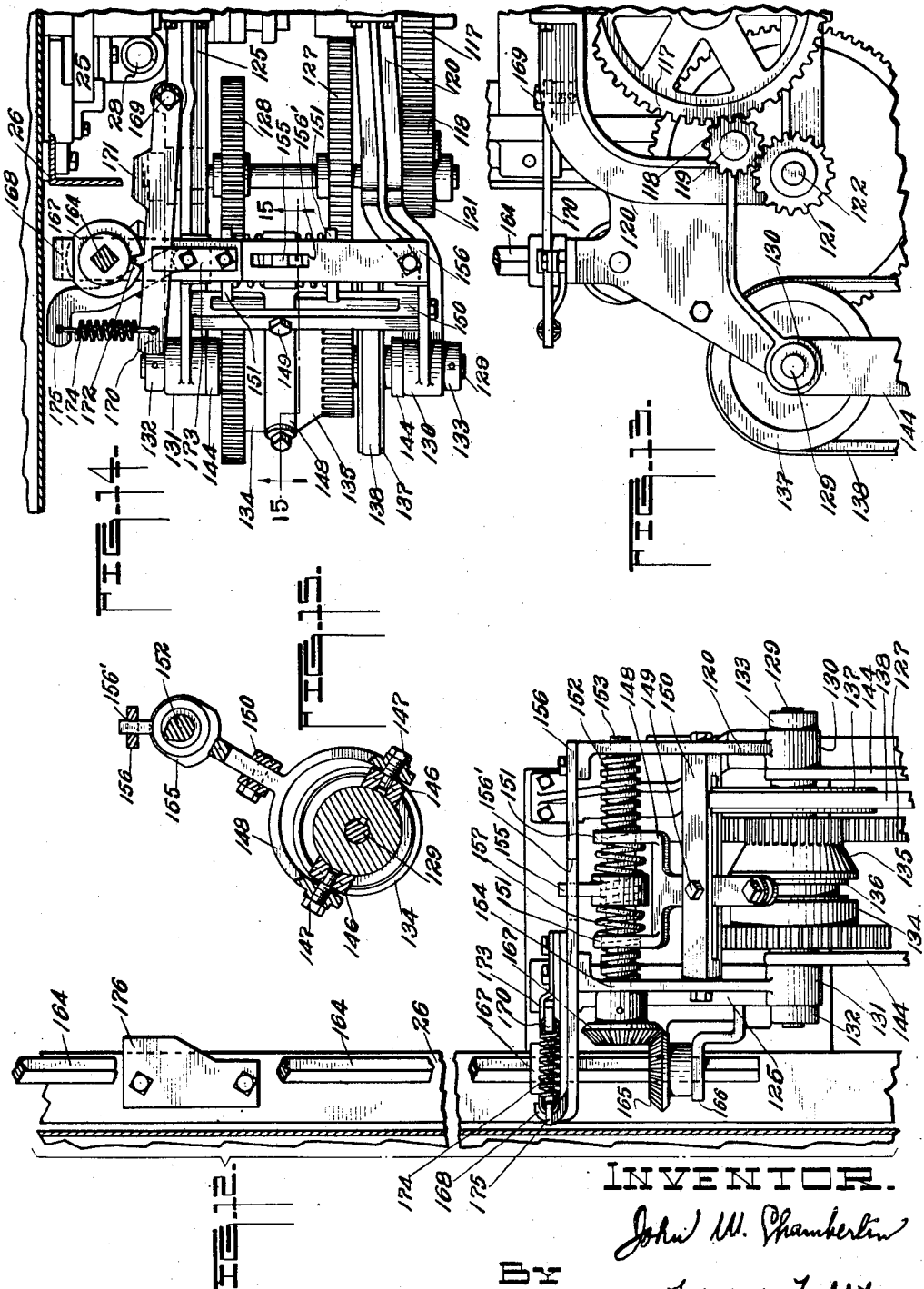

Jan. 3, 1933.   J. W. CHAMBERLIN   1,893,398
DRY CLEANING MACHINE
Filed Oct. 24, 1932   13 Sheets-Sheet 10
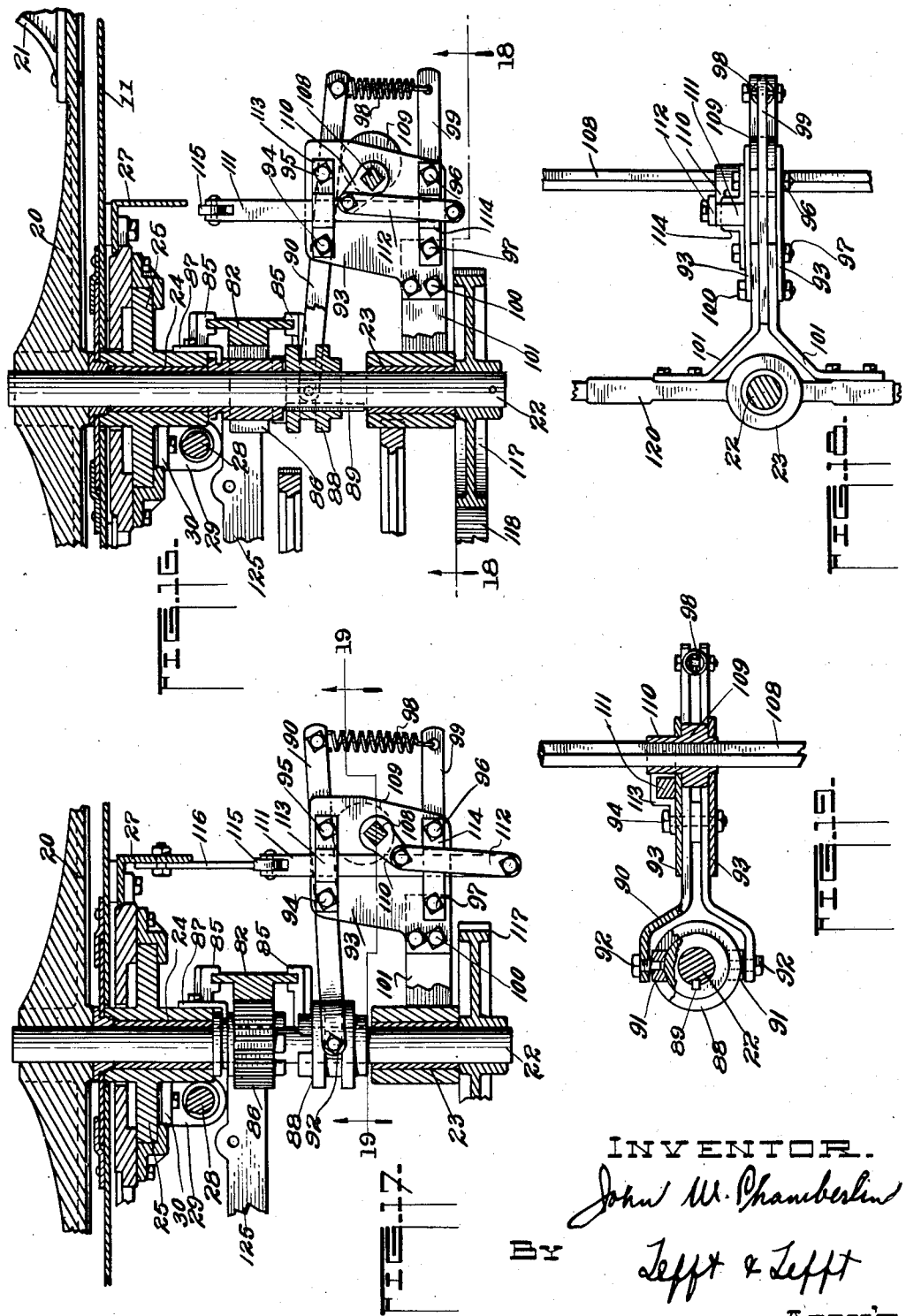

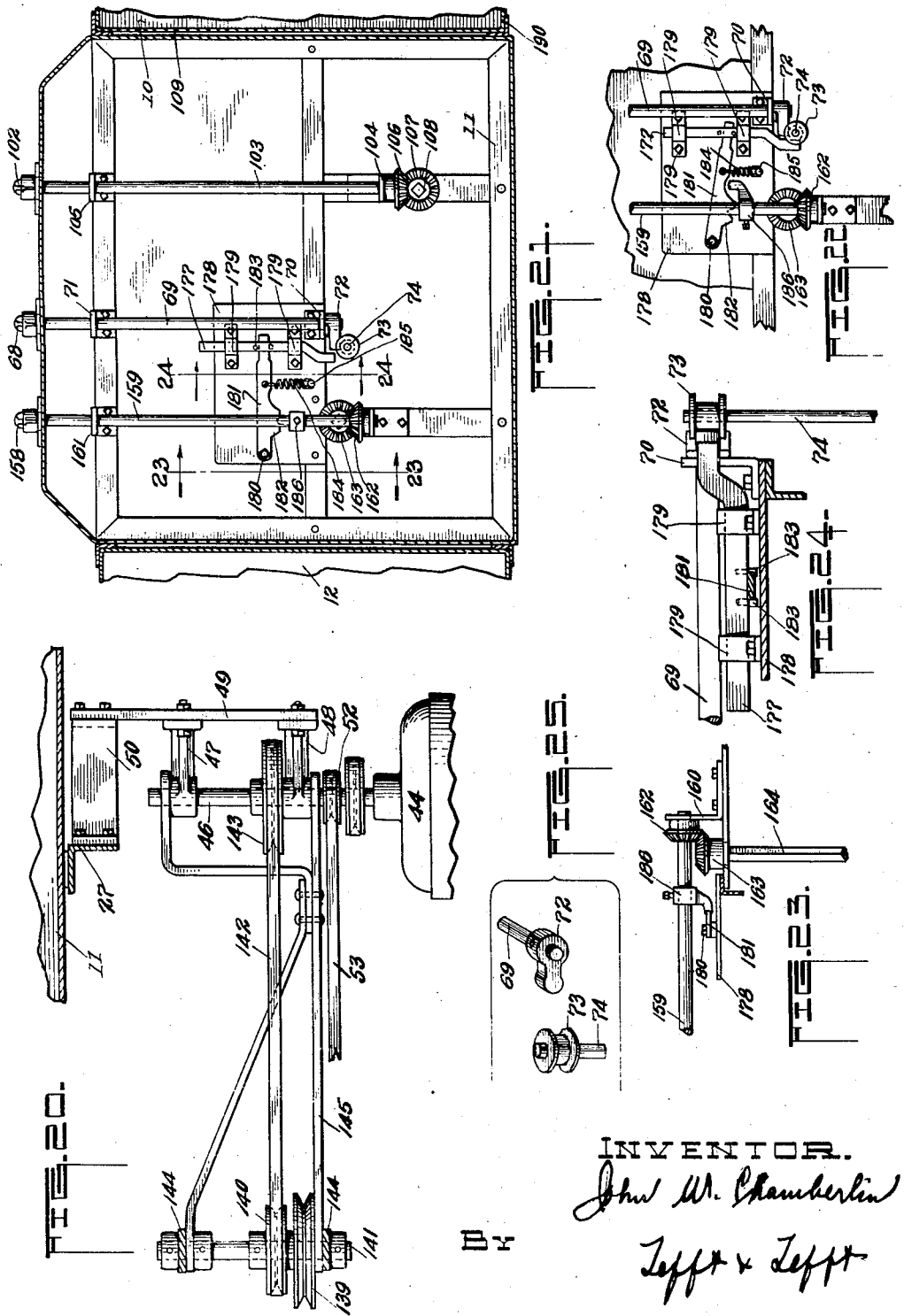

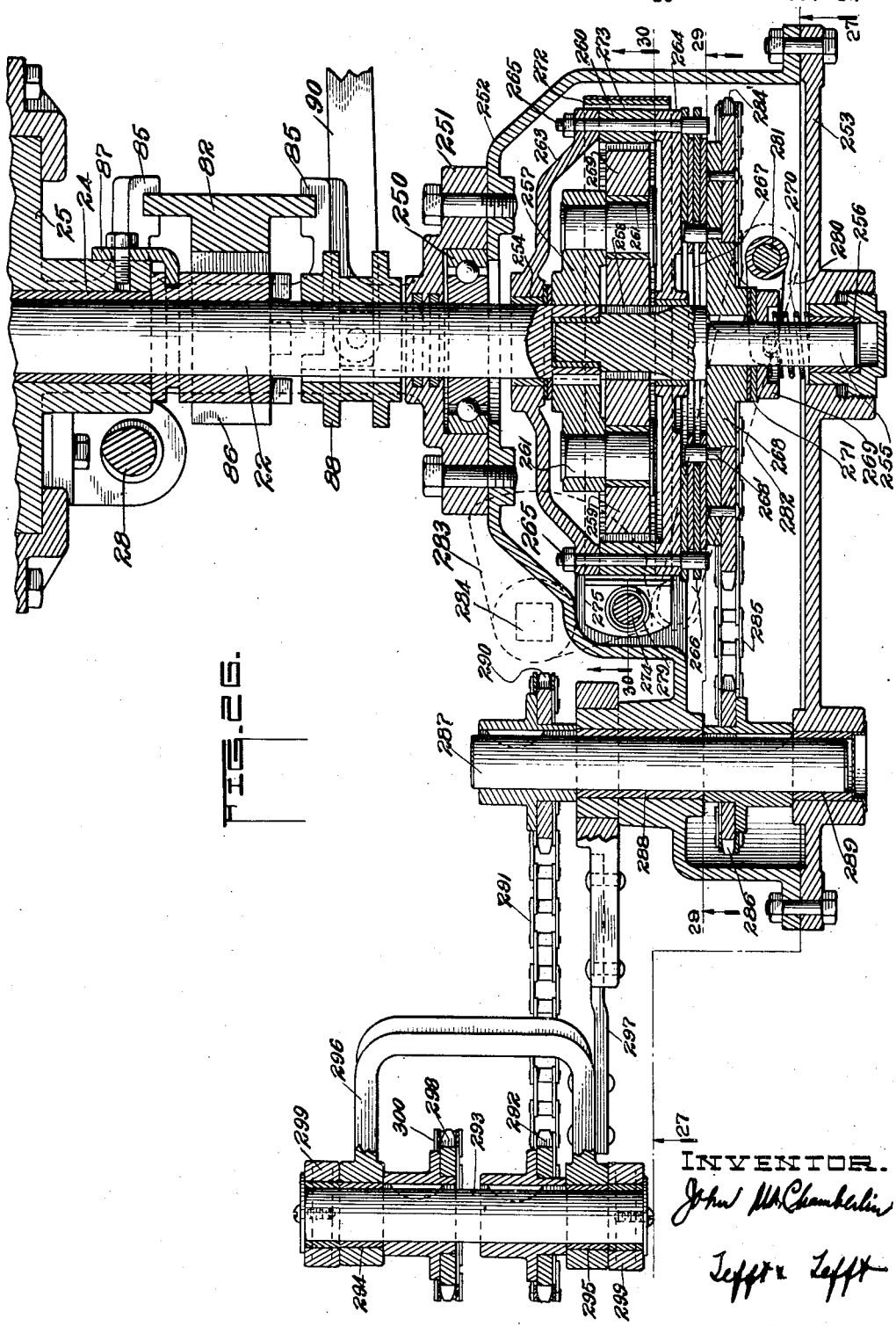

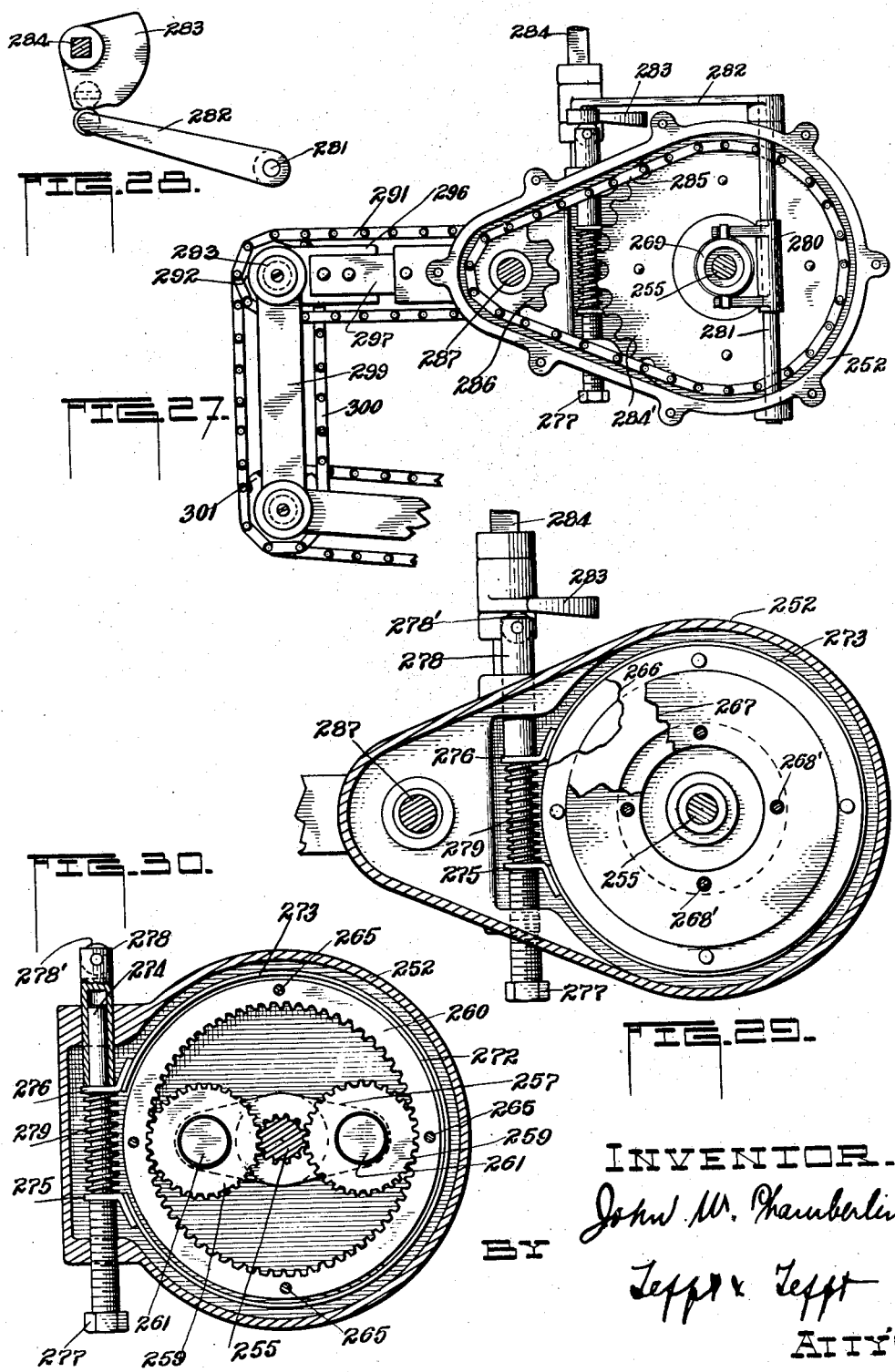

UNITED STATES PATENT OFFICE

JOHN W. CHAMBERLIN, OF AKRON, OHIO

DRY CLEANING MACHINE

Application filed October 24, 1932. Serial No. 639,290.

This invention relates to dry cleaning machines.

One of the objects of the invention lies in the provision of a dry cleaning machine, more particularly adapted for use in the smaller dry cleaning establishment or for multiple unit operation in larger plants, said machine including as a unit, mechanism adapted to clean the garments by submerged agitational movement in a cleaning fluid, said mechanism being operated thereafter in a manner to dry the garments, whereupon they may be removed from the cleaning and drying compartment and placed in an adjacent cabinet for final deordorizing.

Another object lies in the provision of a dry cleaning unit which comprises mechanism adapted to clean and dry garments, said mechanism being connected with an adjacent cooperating, operatively connected cleaning fluid reclaiming mechanism adapted to maintain the cleaning fluid in proper condition for the cleaning operation at all times, the dry garments being adapted to be manually removed from the cleaning and drying unit and placed in another adjacent compartment for the purpose of finally deodorizing same.

Still another object is in the provision of a complete dry-cleaning unit including an operatively connected unit for maintaining the cleaning fluid in proper condition at all times, the cleaning unit itself comprising a horizontally disposed, open ended, perforated chamber capable of agitational movement in a submerged position in a cleaning fluid, said member being capable of removal from said submerged position and so arranged in its final operation as to accomplish the drying of the clean clothes by a spinning or centrifugal movement.

Yet another object lies in the provision of a cleaning and drying unit particularly adapted for the smaller dry cleaning establishments, said device comprising a central chamber connected with a cleaning fluid reclaiming system, said chamber containing therein a horizontally disposed, open ended, perforated cleaning basket capable of submersion in a cleaning fluid, whereupon the garments are cleaned by a reciprocatory movement of said chamber, there being also included mechanism for removing said basket from the cleaning fluid and thereafter spinning same upon a horizontal axis in a manner to extract the cleaning fluid from the garments and to dry same.

A further object is in the provision of a cleaning and drying device, including a cleaning fluid receptacle, there being provided a perforated, horizontally disposed, open ended basket capable of immersion and reciprocatory movement in said fluid to accomplish the cleaning of garments, there being further provided a mechanism for elevating said basket to such a position where same is rotated upon a horizontal axis with a gradual increasing speed for the purpose of initially and automatically distributing the garments in a uniform manner within the basket and thereafter finally extracting the cleaning fluid therefrom.

A still further object is in the provision of a dry cleaning unit which comprises a horizontally disposed, open ended, perforated basket capable of immersion and reciprocatory movement within a receptacle of cleaning fluid for the purpose of cleaning the clothes and removal therefrom to such a position that the cleaning fluid may be extracted from the garments by centrifugal movement of the basket, said centrifugal extraction being accomplished by a gradually increasing acceleration of the basket for the purpose of evenly distributing the clothes therein before said basket is rotated at a high speed.

Yet a further object is in the provision of a dry cleaning unit wherein mechanism is employed for cleaning garments by immersion in a cleaning fluid, there being also means for extracting the cleaning fluid from the garments, said means including a horizontally disposed, open ended, perforated basket so connected with driving mechanism as to initially rotate said basket slowly to accomplish uniform distribution of the garments therein, there being also means for further accelerating the movement of said basket thereafter to accomplish the final extraction of the cleaning fluid from the garments.

An additional object is in the provision of a cleaning and drying unit comprising a chamber having a receptacle for a cleaning fluid, a horizontally disposed, open ended, perforated basket in said chamber disposed in a manner to be agitated in the cleaning fluid in a partially submerged manner for the purpose of cleaning the clothes, there being also mechanism for elevating said perforated basket to an elevated position, and driving mechanism for said basket accomplishing gradually accelerated spinning movement thereof when same is in an elevated position for the purpose of final extraction of the cleaning fluid from the garments.

A further additional object lies in the provision of a cleaning and drying unit, said unit including a receptacle for a cleaning fluid, a horizontally disposed, open ended, perforated basket suspended within said chamber in a manner for partial submergence in the cleaning fluid and agitational movement thereof within said fluid to accomplish the cleaning operation, other mechanism for elevating the basket to an elevated position, other driving mechanism accomplishing a gradually accelerated continuous rotational movement of the perforated basket upon a horizontal axis when in said overhead position, to accomplish initial uniform distribution of the clothes and finally the complete extraction of the cleaning fluid from the garments, manually operated means for controlling the various mechanical movements of said basket, and finally, safety mechanism operatively connected with said manual control means preventing movement of the basket in anything but a predetermined and desired manner.

Means are also provided for withdrawing the contaminated cleaning fluids into and through suitable apparatus for the purpose of purification, the whole forming a complete, self contained cleaning and drying unit.

Other objects will appear in the following specification, taken in connection with the annexed drawings, in which—

Fig. 1 is a front elevational view showing the general arrangement of manual controls, covers, observation ports and other elements to be referred to;

Fig. 5 is an elevational view in the direction of the arrows from line 5—5 in Fig. 4;

Fig. 6 is an elevational view in the direction of the arrows from line 6—6 in Fig. 4 with certain parts omitted to permit a clearer view;

Fig. 7 is an enlarged sectional plan view in the direction of the arrows from line 7—7 in Fig. 4 with several parts shown in dotted lines to facilitate description;

Fig. 8 is a sectional elevation in direction of the arrows from line 8—8 in Fig. 5 with certain parts removed;

Fig. 9 is a detail view taken in the direction of the arrows from line 9—9 in Fig. 8;

Fig. 10 is a fragmentary sectional view taken in the direction of the arrows from line 10—10 in Fig. 8;

Fig. 11 is a fragmentary elevational view taken in the direction of the arrows from line 11—11 in Fig. 10;

Fig. 12 is an enlarged detail view of mechanism to be described, in the direction of the arrows approximately from line 12—12 in Fig. 4;

Fig. 13 is a fragmentary side view of certain parts shown in Fig. 12;

Fig. 14 is a plan view of certain parts shown in Fig. 13;

Fig. 15 is a sectional view in the direction of the arrows from line 15—15 in Fig. 14;

Fig. 16 is a sectional plan view, looking downward, of clutching mechanism to be described, with the clutch in its engaged position;

Fig. 17 is a view similar to Fig. 16, showing the clutch in disengaged position;

Fig. 18 is a detail view of certain parts, taken in the direction of arrows from line 18—18 in Fig. 16;

Fig. 19 is a detail view of certain parts, taken in the direction of the arrows from line 19—19 in Fig. 17;

Fig. 20 is a detail plan view of certain parts, taken in the direction of the arrows from line 20—20 in Fig. 4;

Fig. 21 is a detail plan view taken in the direction of the arrows from line 21—21 in Fig. 4;

Fig. 22 is a detail plan view of locking devices shown in Fig. 21, showing the operative position of several members;

Fig. 23 is a detail view of certain parts taken in the direction of the arrows from line 23—23 in Fig. 21;

Fig. 24 is a detail view of certain parts taken in the direction of the arrows from line 24—24 in Fig. 21;

Fig. 25 is a detail perspective view of parts to be referred to;

Fig. 26 is a sectional plan view of a mechanism for effecting rotation of the drum member to be described, the mechanism shown being adapted to approximately replace the driving mechanism shown in Fig. 7;

Fig. 27 is a reduced view taken in the direction of the arrows from line 27—27 in Fig. 26;

Fig. 28 is a detail view of clutch operating parts to be described;

Fig. 29 is a reduced view taken in the direction of arrows from line 29—29 in Fig. 26; and Fig. 30 is a reduced view taken in the direction of the arrows from line 30—30 in Fig. 26.

Figure 2:
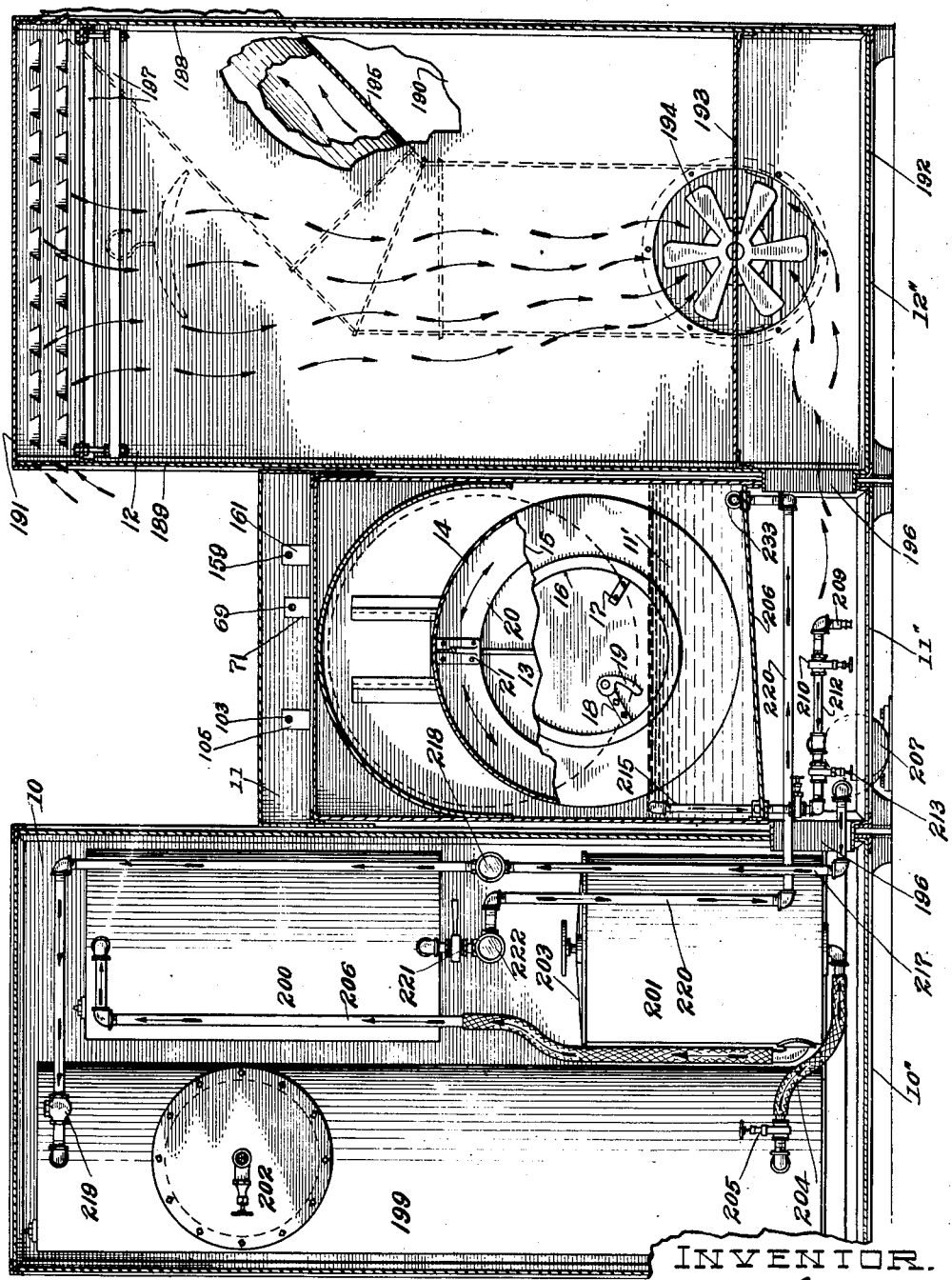
Fig. 2 is a sectional elevation with the front of the cabinets removed.

Referring to Fig. 2 it will be noted that the unit machine includes three general divisions, each supported and housed by substantially separate frames, as follows: First, a frame member 10 which includes a base portion and necessary framing and housing elements to support the tanks, piping and other parts to be described later. This frame, including base portion, will hereafter be referred to as "frame 10". Second, a frame member 11 which includes a base portion and necessary framing and housing elements to support driving and operating devices to be described later. This frame, including base portion, will be referred to as "frame 11." Third, a frame member 12, which is similar in exterior form to frame 10 and adapted to house and support the several elements required for drying, which will be described later. This frame, including base portion, will hereafter be referred to as "frame 12."

The three frames above mentioned may be disposed as shown in Fig. 2, wherein frame 12 is on the right, frame 10 on the left and frame 11 located between the two.

Since the cleaning operation for which this machine is intended originates at the center, or frame 11, position, the mechanism included in this division will be described first.

Figs. 5, 6 and 7 will disclose a drum member 13 which is composed, as best shown in Fig. 7, of a perforated cylindrical body portion 14 to the front side of which is affixed a head portion 15, the latter having a suitably flanged circular opening at its center. Adapted to be retained over this central opening in head 15 is a circular cover 16 having suitable extension fittings as 17 together with a manually operable extension member 18 which is adapted, through a hand lever 19, to act as a locking device whereby the cover 16 may conveniently be removed and replaced, all as best shown in Fig. 2.

Fig. 7 will indicate that cylinder 14 is attached to and supported by a ribbed circular back plate member 20, the assembly being structurally reinforced by baffle members 21 suitably disposed and attached, as shown.

Back plate 20 is affixed to a horizontally disposed shaft 22 which is journaled in bearing members 23 and 24, the latter being supported by suitable brackets upon an elevator frame 25.

Fig. 8 will perhaps best illustrate that elevator frame 25 is slidably retained by, and adapted to move vertically along the two rail members 26 and 27 suitably disposed and supported by means of attachment with the base and ceiling portions of frame 11, as shown. It will be clear that drum 14 may be rotated with shaft 22, as already noted, and in addition may be elevated and lowered by reason of its mounting upon the slidable elevator frame 25.

A possible elevated position of drum 14 is indicated by dotted lines in Fig. 2. Rotary driving means for drum 14 will be described later.

Vertical movement of frame 25 is provided through a power driven screw member 28 vertically disposed as shown in several views, particularly Figs. 8, 16 and 17.

Screw 28 is adapted to rotate in a threaded block member 29 which is affixed to frame 25 by means of a bracket member 30, the said block 29 acting to retain screw 28 in suitable vertical alignment. Near its lower end, the shaft portion of screw 28 is shouldered as at 31 in Fig. 10, the shoulder rotatably resting upon a bearing portion 32 formed integrally with a supporting stand 33, as shown best in Figs. 10 and 11. Fig. 10 will indicate that a contracted portion of shaft portion of screw 28 passes downwardly through bearing 32 and terminates at a lower bearing 34, which latter is formed, like bearing 32, integrally with stand 33.

It is thought clear that the weight of the elevator frame 25, together with all members attached thereto, is supported upon the thread of screw 28 and consequently upon the shoulder 31, seated upon bearing 32. Obviously rotation of screw 28 will result in vertical movement of elevator frame 25, the direction and extent of such movement depending upon the direction and duration of rotation of the screw.

Rotation of screw 28 is accomplished in the following manner:

Fig. 10 will disclose two bevel gears, 35 and 36, each having a plurality of inwardly projecting tooth portions, as shown. The said gears are rotatably mounted upon the contracted portion of screw shaft 28 and so disposed as to be in constant mesh with an intermediate driving bevel gear 37. Means for driving the gear 37 will be described later.

Disposed between gears 35 and 36 is a clutch member 38 having outwardly projecting tooth portions which are adapted to engage similar portions of either gears 35 or 36, also a continuous groove portion, as shown. Clutch member 38 is slidably mounted upon screw shaft 28 being retained against rotation thereon by a suitable feather key. Engaging in the groove of clutch member 38 is an eccentric member 39 extending from a stub shaft 40, which latter is journaled in a bearing 41 formed in a housing cap member 42. Stub shaft 40 extends beyond bearing 41 and is provided at its outer end with a rigidly affixed spur pinion 43, all as shown in Fig. 10. The function of pinion 43 will be explained later.

The foregoing description, together with Fig. 10, will illustrate that rotation of gear 37 will result in idle rotation of gears 35 and 36 in opposite directions, also that partial rotation in either direction of stub shaft 40 will, through the eccentric motion of extension 39, tend to shift clutch member 38 into engagement with either of gears 35 or 36. Clutch member 38, being keyed to screw shaft 28, it is obvious that engagement between clutch member 38 and gear 35 will result in unitary directional rotation of screw shaft 28, while opposite rotation of shaft 28 will result from engagement between clutch member 38 and gear 36. Thus, it will be clear that, with gears 35 and 36 in rotation as a result of rotation of gear 37, and clutch member 38 in intermediate or neutral position, no rotation of screw shaft 28 will take place; however, suitable rotation of stub shaft 40, as above noted, will result in predetermined directional rotation of screw shaft 28.

Figure 4:
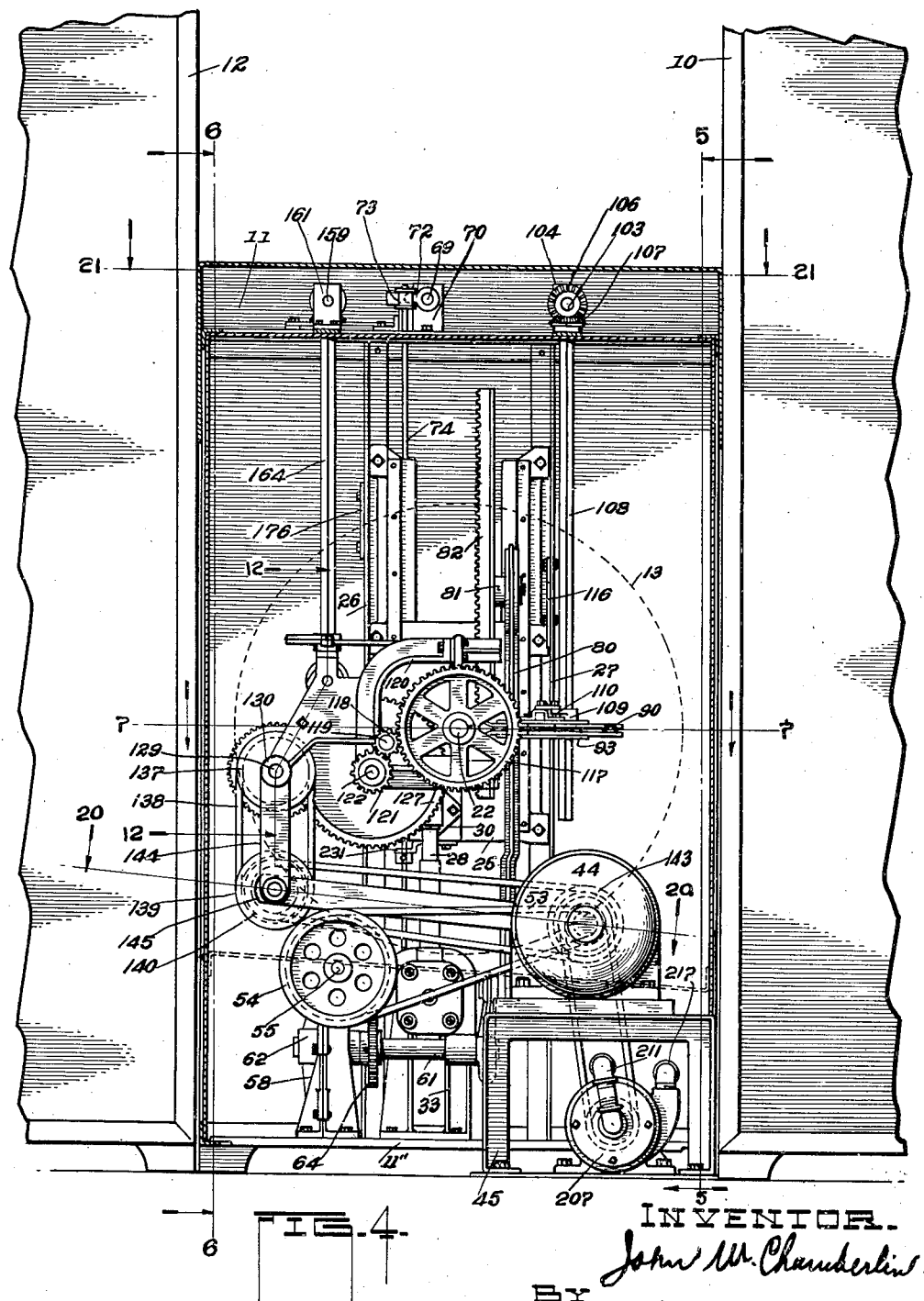
Fig. 4 is a rear elevation of the cleaner section with the cover removed.

Mention has already been made of a bevel gear 37 as meshed with gears 35 and 36. During the usual operation of this cleaning machine, gear 37 is in constant rotation. Power for driving this, together with the several additional mechanisms of the machine, all of which are to be described, is provided by a suitable power source such as an electric motor 44. The motor, which may be of any well known make, will not be described further than to say that it is properly disposed and supported upon a suitable stand, as 45, which latter is attached to the building floor as generally shown in Figs. 4, 5 and 6.

The rotor shaft of motor 44, which is designated 46, extends within the housing frame 11 and is rotatably supported at its outboard end by bearings formed in bracket members 47 and 48, which latter are attached to frame 11 through bracket members 49, and 50, as best shown in Fig. 20.

Fig. 20 will also illustrate that shaft 46 is adapted to carry several pulleys and other members to be described.

Power for driving the gear 37, as recently noted, is provided by motor 44 through a pulley 52 affixed to shaft 46, a belt 53 and a pulley 54 affixed to a shaft 55. Shaft 55 is journaled in bearings 56 and 57 formed in a housing support 58, and carries a worm 59, which latter is disposed in mesh with a worm gear 60, as best shown in Figs. 4 and 6.

Worm gear 60 is affixed to a horizontally disposed shaft 61 which is journaled in bearings 62 and 63 formed respectively in housing support 56 and supporting stand 33, as best shown in Fig. 8.

To the shaft 61 is affixed a spur gear 64, disposed to mesh with a pinion 65, as best shown in Fig. 11. Pinion 65 is affixed to a stub shaft 66 which latter is journaled in a bearing 67 formed integrally with support stand 33. To the inner end of stub shaft 66 is affixed bevel gear 37 already noted.

The foregoing description, together with the drawings referred to, will illustrate that elevator frame 25, carrying drum 14 may be elevated or lowered by power derived from motor 44 through belt 53, worm 59, worm gear 60, shaft 61, gear 64, pinion 65, stub shaft 66, bevel gear 37, bevel gear 35 or 36, coupled with clutch member 38, screw shaft 28 and threaded block 29.

Figure 1:
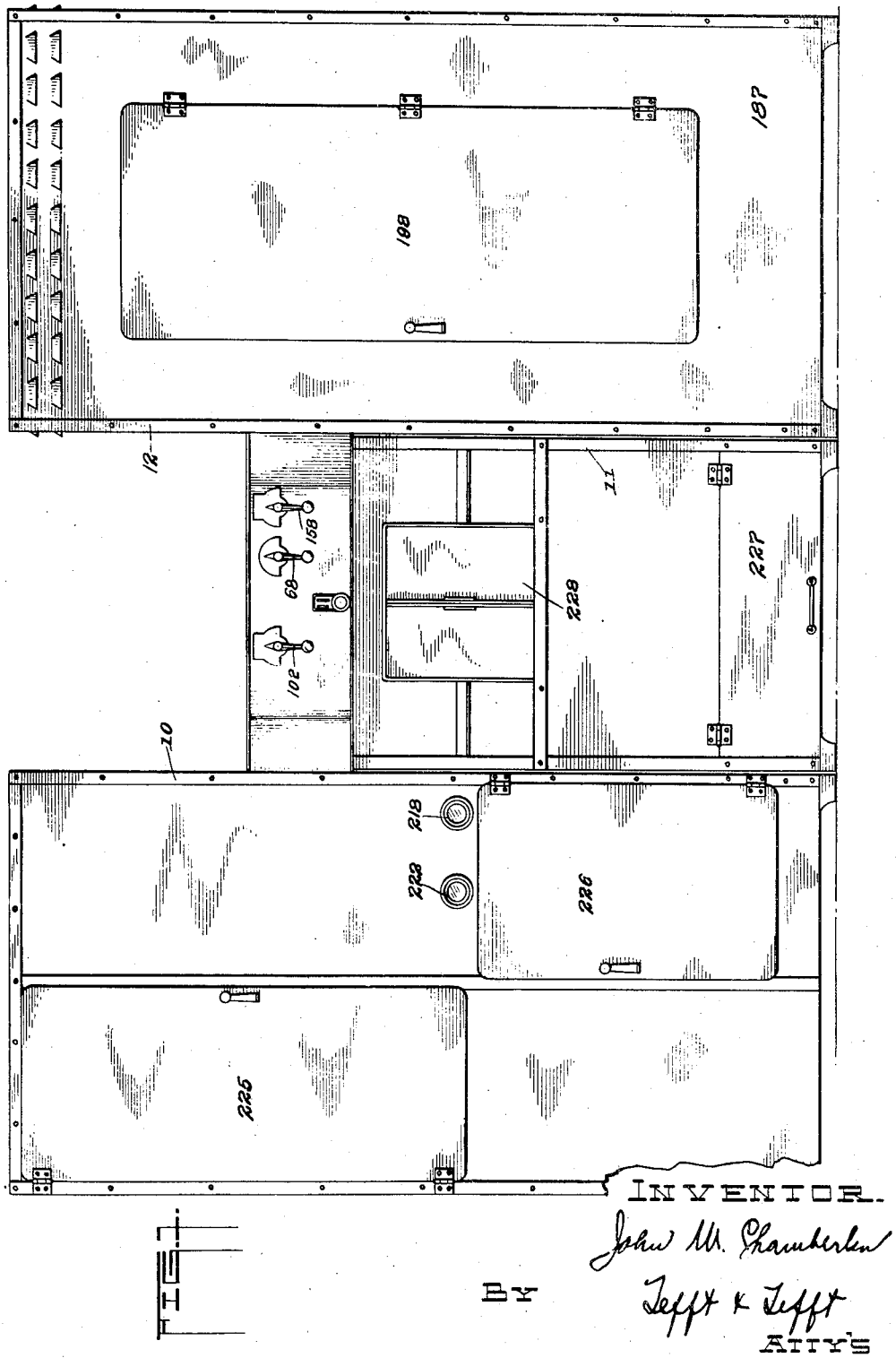

Manual control of the elevating means just described is provided in the following manner: Fig. 1 will disclose a hand lever 68 conveniently disposed on a panel portion of frame 11. The said lever 68 is affixed to a horizontal shaft 69 which is journaled in bearings 70 and 71, the latter being attached to frame 11, as best shown in Fig. 21. To the end of shaft 69 is affixed a crank member 72 having a beaded end adapted to operate in engagement with a flanged collar 73, both of which are shown in perspective detail in Fig. 25, and in operative assembly in Figs. 21 and 24.

Flanged collar 73 is affixed to an upright rod member 74, the upper end of which is slidably retained by a suitable opening in frame 11, while the lower end is pivotally attached to a gear segment 75, by means of a screw 76, as best shown in Fig. 11. Segment 75 is pivotally supported upon support stand 33 by means of a screw 77 and is disposed to mesh with pinion 43, already noted. From the foregoing, it will be apparent that partial rotation of the hand lever 68 in either direction from an indexed position, will result in corresponding vertical movement of rod member 74 with consequent rocking movement of segment 75 to rotate pinion 43 with stub shaft 40 and eccentric member 39 thereby transmitting a shifting movement to clutch member 38. Practical adjustment of the several parts would provide that when hand lever 68 is positioned as shown in Fig. 1, clutch member 38 is positioned in neutral relation, as shown in Fig. 10. Thus, it will be clear that drum 14 may be conveniently elevated or lowered by suitable manipulation of hand lever 68 to right or left, by means already described.

Vertical movement of elevator frame 25 is automatically limited by means of a forked bracket member 231 affixed to elevator frame 25 and two collars 229 and 230, both of which are affixed to rod member 74, as best shown in Fig. 8.

The forked bracket member 231 and collar 230 are so disposed as to engage when elevator frame 25 reaches a predetermined elevated position, while collar 229 is engaged by bracket member 228 near the limit of downward travel.

It will be clear that the described engagement of bracket 231 with collar 230 will result in upward vertical movement of rod member 74 while engagement with collar 229 will result in downward movement of rod 74. This mechanical actuation of rod 74 is identical with that imparted by the already described manipulation of the control handle lever 68. Thus the control means is automatically actuated to limit the vertical movement of drum 14.

Mention has already been made that drum 14 is supported by and adapted to rotate with shaft 22. Practical use of the drum requires that it may be rotated in an alternating manner while in its lowered or immersed position, and in a continuous manner when elevated to a non-immersed position.

Alternating rotation of the drum is accomplished by means of a crank 78 which is affixed to the extending end of driving shaft 61 already noted. Rotatably attached to crank 78 by means of a stud 79, is a connecting rod 80, the upper end of which is slotted as shown in detail in Fig. 9. A stud portion 81 of a rack member 82 is adapted to carry a pivotally mounted block member 83 which latter is adapted to be slidably mounted in the slotted portion of connecting rod 80 and yieldably retained centrally therein by opposing compression springs 84, as shown in detail in Fig. 9. The utility of the yieldable coupling just described will be referred to shortly.

Rack member 82, as shown in Figs. 8 and 16, is provided on either side with flanges which adapt it to be slidably retained by guide bracket members 85, which latter are attached to elevator frame 25, as indicated in Fig. 8.

Fig. 8 will also indicate that rack member 82 is so disposed as to mesh with a pinion 86, which is adapted to rotate freely upon shaft 22. Referring to Fig. 17, it will be noted that pinion 86 is retained in proper position upon shaft 22 by a clip member 87, affixed to bearing member 24 and having a portion adapted to engage a continuous groove formed in the left hand hub portion of pinion 87, as shown. Extending from the right hand end of pinion 87 is a plurality of tooth portions which are adapted to be engaged by similar extending teeth formed in the body of a clutch member 88, which latter is slidably mounted upon shaft 22 in keyed relation thereto by means of a feather key 89, best shown in Fig. 7.

Shifting of clutch member 88 into and out of engagement with pinion 86 is accomplished by means of a yoked lever 90 having rollers as 91 rotatably supported upon inwardly extending studs 92, said rollers being adapted to operate within a continuous groove formed in clutch member 88, as shown in detail in Fig. 19.

Lever 90 is pivotally supported between suitably spaced plate members 93 by means of a bolt 94 and is tensioned by an extension spring 98, which is anchored to an extending bracket member 99, the latter being attached between plate members 93 by means of bolts 96—97—100, as shown in Fig. 18. Plate members 93 are supported by bracket members 101 which are attached to elevator frame 25, as shown.

The foregoing description, together with drawings referred to, will illustrate that spring 98 tends to urge clutch member 88 into engagement with pinion 86.

Assuming that the several parts are in engaged position, as shown in Fig. 16, it will be apparent that alternating rotation of drum 14 will result from rotation of driving shaft 61, through crank 78, reciprocal movement of connecting rod 80, alternating vertical movement of rack 82, meshing with pinion 86, to impart alternating rotation to shaft 22 through coupling with clutch member 88. To obviate unnecessary vibration and stresses on the several parts, due to frequent stoppage and reversal of movement, a suspended coupling between connecting rod 80 and rack 82 is desirable. Such a coupling is provided through springs 84, as already described.

Manual control of the alternating rotational movement is accomplished by the following means:

Fig. 1 will disclose a hand lever 102 similar in appearance to and located near elevator control hand lever 68, already described. Fig. 21 will best show that hand lever 102 is affixed to a horizontal shaft 103 which is rotatably supported in bearing brackets 104— 105, the latter being attached to frame 11, as shown. To the inner end of shaft 103 is affixed a mitre gear 106 which is shown meshed with a similar gear 107.

Figs. 4 and 5 will illustrate that gear 107 is affixed to a vertical depending shaft 108 of square cross section, rotatably mounted in and supported by a suitable bearing formed in frame 11.

Figs. 16, 17 and 19 will disclose that an eccentric member 109 is rotatably retained between plates 93 by means of extended boss portions passing through circular openings in plates 93, as shown in section in Fig. 19. Eccentric 109 has a rectangular bore which is adapted to receive, in a slidable relation, the shaft 108, which shaft is so disposed as to align with the said eccentric member. Mention has already been made of spring 98 as tensioning lever 90. It will be noted that eccentric 109 is so disposed as to oppose movement of lever 90 as urged by spring 98. Thus, movement of clutch member 88 to and from engagement with pinion 86 is imparted through suitable rotation of eccentric 109. The connecting means between hand lever 102 and eccentric 109 having been described, it will be obvious that with parts suitably adjusted partial rotation of hand lever 102 will impart similar rotation to shaft 108 and eccentric 109, resulting, by means described, in desired movement of clutch member 88 to maintain or discontinue alternating rotation of drum 14.

As has already been explained, elevator frame 25 with drum 14 is adapted to be elevated or lowered. It is obviously necessary that the control means just described remain operable throughout the vertical stroke of elevator frame 25. This requirement is satisfied in the present case by the arrangement described, wherein shaft 108 may remain vertically stationary while eccentric 109 is free to slide upon it in unison with elevator frame 25, without disturbing the keyed relation between shaft 108 and eccentric 109.

While a continuous keyed relation is maintained, as above described, it is nevertheless a fact that in practical use, alternating rotation of drum 14 is not desired when drum 14 is in an elevated position.

In order to insure that alternating rotation will be discontinued when drum 14 is elevated above a predetermined low point, means for automatically disengaging clutch member 88 from pinion 86 are provided as follows: Fig. 16 will disclose a crank 110 which is integral with the upper hub portion of eccentric 109. The crank is adapted to operate a sliding bar member 111 through a suitable link member 112 as clearly shown in Figs. 16 and 17. Bar member 111 is slidably mounted upon upper plate member 93 by means of clip members 113 and 114 attached by bolts 94, 95, 96 and 97, as shown. A roller 115 is rotatably mounted in a slotted end portion of bar 111 by means of a suitable rivet, as shown. Roller 115 is so disposed as to contact with a cam member 116 which latter is affixed to the flange portion of rail member 27, as best shown in Fig. 5. Cam member 116 is so formed and disposed upon rail 27 as to engage roller 115 when elevator frame 25 is elevated above a predetermined low point, the contour of cam 116 being such as to displace roller 115 together with bar 112 toward the right as in Fig. 17 and toward the left, as in Fig. 5. Such displacement of bar 112 will result in partial rotation of crank 110 and eccentric 109 through link 112 as already described. It will be apparent that the latter described movement of eccentric 109 is similar to that resulting from manipulation of hand lever 102. As is clearly shown in Fig. 16, eccentric 109, together with crank 112 are so adjusted with relation to each other and to lever 90 that when eccentric 109 is rotated to a position resulting in disengagement between clutch 88 and pinion 86, eccentric 109 is in a dead centered position with relation to lever 90, also crank 110 is so positioned that sliding bar 111 is retained in a right handed position, as shown. It will be obvious that with the parts positioned as in Fig. 17, clutch 88 will normally remain disengaged until eccentric 109 is manually rotated to the position shown in Fig. 16, wherein spring 98 has rotated lever 90 to place clutch member 88 into engagement, as described, and crank 110 has propelled sliding bar 111 to a left handed position, as shown. It will be clear that disengagement may be effected by reverse manipulation of hand lever 102 through means described or by displacement of sliding bar 111, through link 112 and crank 110 already described.

Obviously, when the elevator frame 25 is in an elevated position, sliding bar 111 will be retained in right hand position, as shown in Fig. 17 by cam 116. Thus, manipulation of eccentric 109 into engagement position is prevented.

Summarizing the foregoing, it will be apparent that with drum 14 in lowered position, hand lever 102 may be manipulated to engage the described parts to start alternating rotation of drum 14. Reverse manipulation will result in disengagement and stoppage of such rotation. In case an operator should engage the elevating means and at the same time fail to disengage the rotating means, elevation of frame 25 would result in automatic disengagement of the rotating means and locking of the control parts against manual re-engagement while the drum is elevated. Also, the rotating means, once disengaged as noted will remain disengaged after drum 14 is returned to lowered position. Re-engagement is possible only through manual means and then only when drum 14 is in lowered position.

Continuous rotation of drum 14 is desired only when the drum is in an elevated position. Since such rotation is utilized for the purpose of extracting liquid from the garments contained in the drum by centrifugal action, it is necessary that the rotational speed be sufficient to efficiently effect such extraction. Sufficient power to impart such speed should not, under practical conditions, be suddenly applied. To effect a more gradual application of power such means as shown herein may be utilized, as follows:

Figs. 4 and 7 will disclose a spur gear 117 affixed to the outer end of drum shaft 22. Gear 117 is disposed to mesh with an idler pinion 118 which is rotatably supported by stud 119, which latter projects from a bracket member 120. Bracket member 120 is affixed to elevator frame 25. Meshing with pinion 118 is a pinion 121 which is affixed to the projecting end of a parallel shaft 122. Shaft 122 is journaled in bearings 123 and 124, the former being integral with bracket member 120 and the latter integral with a bracket member 125 as shown. Bracket member 125 is affixed to elevator frame 25. Shaft 122 is retained against longitudinal movement by pinion 121 and collar 126. Disposed between bearings 123 and 124 are two spur gears 127 and 128, of unequal diameter, each being affixed to shaft 122, as shown.

Suitably disposed parallel to shaft 122 is a shaft 129 which is journaled in bearings 130 and 131, the former being integral with bracket member 120, the latter integral with bracket member 125. Shaft 129 is retained against longitudinal movement by collars 132 and 133, as shown.

Supported upon shaft 129 is a selective clutching assembly of the cone type composed of two oppositely disposed female clutch members 134 and 135, both rotatably mounted and having integral gear portions, as shown.

Gear portion of member 134 is of suitable diameter to mesh with gear 128, which is of comparatively small diameter, while the gear portion of member 135 is adapted to mesh with gear 127 which is of comparatively large diameter.

Disposed between the members 134 and 135 is a double male clutch member 136 slidably mounted upon shaft 129 and keyed thereto by means of a feather key, as clearly shown in Fig. 7.

It will be noted that shaft 129 carries, in addition to the clutch assembly just mentioned, a keyed pulley 137. Reference to Figs. 4 and 20, will disclose that pulley 137 is adapted to be rotated by means of a belt 138, driven by a pulley 139, which latter is affixed, together with a pulley 140, to a countershaft 141. Pulley 140 is adapted to be driven, through a belt 142, by a pulley 143 which is affixed to motor shaft 46, as best shown in Fig. 20.

To permit vertical movement of the driven pulley 137, in unison with elevator frame 25, without disturbance of its connection with the power source, countershaft 141 is rotatably supported, in equalized adjustable relation, with associated parts, by means of link members 144 which are rotatably supported by shaft 129 as shown in section in Fig. 7. Countershaft 141 is retained in spaced relation with motor shaft 46 by a link member 145 which is rotatably supported at the motor end by motor shaft 46 and at the countershaft end by links 144, through shaft 141.

Referring to Fig. 20, it will be apparent that countershaft 141 is retained in suitable parallel alignment with motor shaft 46 by link member 145 and in a similar relation to shaft 129 by link members 144, as best shown in Fig. 4. Since link 145 is free to rotate about motor shaft 46 and links 144 are free to rotate about shaft 129. it is clear that vertical movement of shaft 129 can result only in angular movement of the said links while the spaced relation between the several shafts is undisturbed. Thus, power transmitted through belts 142 and 138 is available at any vertical position of elevator frame 25.

The foregoing description, together with the several drawings referred to, will illustrate that, with the motor running, clutch member 136 will be rotated with shaft 129 through pulley 137, belt 138, pulleys 139 and 140 with countershaft 141, belt 142 to driving pulley 143. With the clutch member 136 in disengaged or neutral position shown in Fig. 7, no rotation will be imparted to clutch members 134 or 135. If clutch member 136 be shifted into frictional engagement with member 135, rotation will be set up in the latter with consequent rotation of drum 14 through gear 127, shaft 122, pinion 121, idler 119, gear 117 and shaft 22.

If, with the drum 14 rotating in ratio with shaft 129, as above described, clutch member 136 is shifted out of contact with member 135 and into contact with member 134, the rotational speed of drum 14 will be accelerated to and retained at a higher rate due to the higher ratio existing between gear portion of member 134 and gear 128. The utility of the above described assembly will be explained later.

Manual control of the described means is accomplished by a suitable mechanism as follows:

Detail views shown in Figs. 7 and 12 will disclose that clutch member 136 has a continuous groove disposed about its central portion, which is adapted to receive, in a slidable relation, two block members 146. The latter are rockably mounted upon studs 147 which extend inwardly from yoke portions of a lever 148 as shown in detail in Fig. 15. Lever 148 is pivotally supported, by means of a bolt 149, upon a transverse member 150 which is rigidly affixed between bracket members 120 and 125 as shown in Figs. 12 and 14. As more clearly shown in Fig. 12, lever 148 carries at its lower end, a yoked portion disposed at right angles with the upper yoked portion, the legs being designated 151. Suitable openings are provided in both legs to permit insertion in a loose manner of a screw 152 which latter is journaled in bearings 153 and 154 formed in brackets 120 and 125 respectively. Mounted upon screw 152, and disposed as shown between legs 151, is a nut member 155 having an extended portion, as shown, which is adapted to be slidably retained within a slot formed in a transverse structural member 156′, which latter is affixed to bracket members 120 and 125, as shown.

Retained between either leg 151 and nut member 155 are compression springs 157 which are adapted to communicate movement of nut member 155 to either of legs 151. The foregoing will illustrate that clutch member 136 may be selectively shifted, as already described, into contact with either of clutch members 134 or 135 by selective rotation of screw 152, through nut member 155, a spring 157 and lever 148. The function of springs 157 is to form a yieldable coupling between nut member 155 and lever 148 so that a firm, yet yielding contact pressure may be maintained between the clutch members.

Manual operation of screw 152 is effected by the following means:

Figs. 1 and 21 will disclose a hand lever 158 conveniently disposed near hand levers 68 and 102 already noted. Lever 158 is affixed to a horizontal shaft 159 which is supported in bearing brackets 160 and 161 in a manner similar to shafts 69 and 103.

Affixed to shaft 159 is a mitre gear 162 so disposed as to mesh with a similar gear 163, which latter is affixed to a depending vertical shaft 164, the latter being best shown in Figs. 4 and 12.

Shaft 164 is of rectangular cross section and is rotatably mounted at its upper end in a suitable bearing formed in frame 11, its weight being supported by the hub portion of gear 163 seated upon frame 11.

Fig. 12 will indicate that a mitre gear 165 having a rectangular bore, is slidably retained in a keyed relation upon shaft 164 by a bracket member 166 which is attached to bracket 125. Gear 165 is so disposed as to align and mesh with a similar gear 167, which latter is affixed to an extended shank portion of screw 152, as shown.

The foregoing will illustrate that manual rotation of hand lever 158 will result in unitary rotation of screw 152 and actuation of clutch member 136 through shaft 103, gears 106 and 107, shaft 164, gears 165 and 167, screw 152, nut 155, through springs 157 to lever 148. This operable coupling is maintained throughout the vertical stroke of the elevator frame.

Continuous rotation of drum 14 is desired, however, only when the drum is in an elevated position. Therefore, means are provided for locking the control mechanism against operation when the elevator frame 25 is in any other than the elevated position, as follows:

Figs. 12 and 14 will disclose a collar member 167 having a rectangular bore adapting it to slide, in keyed relation, upon shaft 164 in a manner similar to gear 165. Collar member 167 is retained in suitable position with relation to associated parts by a hooked extending portion of structural member 156 as shown at 168.

Pivotally supported upon bracket 125, by means of a screw 169 is a lever 170 having a shouldered portion 171 and a tooth portion 172, which latter is adapted to engage in a notch formed in the periphery of collar member 167, all as clearly shown in Fig. 14. Lever 170 is suitably retained, as shown, by a clip member 173 and is tensioned to urge tooth 172 toward engagement with cam 167 by an extension spring 174 which is anchored by a bracket member 175 affixed to structural member 156 as shown.

Affixed to rail member 26 as shown best in Figs. 4 and 12, is a cam member 176 which is so disposed as to engage shouldered portion 171 of lever 170. As shown in the various views, cam 176 is so located that engagement with shoulder 171 will take place only when elevator frame 25 is in a predetermined elevated position.

With the several members in locked position as in Fig. 14, it will be obvious that suitable elevation of elevator frame 25 will result in engagement between shoulder 171 and cam 176 with consequent displacement of lever 170 to withdraw tooth 172 from locking engagement with cam 167. Thus, the means for control of continuous rotation is made operative only when elevator frame 25 is in a predetermined elevated position, and is locked against operation when the elevator frame is any other position.

The foregoing has described effective means for controlling the several operating movements of drum 14, elevator, alternating rotation and continuous rotation. Practical considerations obviously require that either of the three movements be independently operable, and further that no two movements be simultaneously operable.

It has already been noted that the means for alternating rotation is operable only when drum 14 is in lowered position and that if the elevating means is thrown into operation while alternating rotation is in progress the latter will automatically be disconnected by means of cam member 116 through mechanism already described.

It has also been noted that continuous rotation is operable only when drum 14 is in an elevated position.

Since alternating rotation is operable only when drum 14 is lowered and continuous rotation is operable only when it is elevated it is clear that the requirements of safety are taken care of by the obvious impossibility of simultaneous operation of the several means of rotation.

It may be in order to note here that the described mechanisms for automatically controlling the manual control means is adapted to overcome any physical effort on the part of an operator. It is therefore clear that danger of damage or injury to the mechanism or operator, through improper manipulation of the control means, is effectively obviated.

To further insure against improper manipulation, it is desirable to obviate the possibility of lowering drum 14 while the drum is in continuous rotation in the elevated position. To provide against such possibility, an interlocking mechanism operating between the elevator control and continuous rotation means, is provided as follows:

Figs. 21, 22, 23 and 24 will disclose a sliding rectangular bolt member 177 suitably retained upon a base plate member 178 by means of clip members 179. Base plate member 178 is affixed to a structural portion of frame 11, all as shown in Fig. 21. One end of bolt member 177 is disposed and adapted to engage the flanged collar 73 already noted. Pivotally mounted and suitably disposed upon plate 178 by means of a screw 180 is a lever 181 having a cam portion as 182 and its free end so formed as to loosely engage between two studs 183, which latter extend from the under surface of bolt member 177, as shown.

A spring 184, anchored to plate 178 by means of a stud 185 and hooked to lever 181 as shown, tends to urge bolt member 177 into engagement with flanged collar 73, through lever 181 and studs 183.

As best shown in Fig. 22, a crank member 186 is affixed to shaft 159, the said crank having an angular projecting portion which is disposed and adapted to engage cam portion 182 of lever 181.

Crank member 186 is so disposed and adjusted upon shaft 159 that when the latter is suitably rotated crank 186 will engage with cam portion 182 in such a manner as to displace lever 181 to withdraw bolt member 177 from engagement with collar 73.

The movements are clearly indicated in Figs. 21 and 22. Fig. 21 shows crank 186 rotated out of engagement with cam portion 182 and bolt member 177 engaged with collar 73 through operation of spring 184 and lever 181. Fig. 22 shows shaft 159 rotated so as to position crank 186 in engagement with cam portion 182 with resultant extension of spring 184 and positioning of lever 181 to place bolt member 177 out of engagement with collar 74.

It has been noted that shaft 159 is an element through which manual control of continuous rotation of drum 14 is effected and that flanged collar 74 is an element through which similar control of the drum elevating means is accomplished.

In view of this it will be clear that, with crank 186 so adjusted upon shaft 159 that it will occupy the position shown in Fig. 22, when shaft 159 is rotated to cause continuous rotation of drum 14, sliding bolt 177 is in position to lock the elevator control mechanism against manipulation. Obviously, when shaft 159 is manipulated in such a way as to discontinue rotation of drum 14, crank 186 may be positioned as shown in Fig. 21, wherein the crank has contacted with cam 182 to displace lever 181 causing withdrawal of bolt 177 as already described. Thus, the elevator means may not be operated unless continuous rotational means is made inoperative.

Mention has been made of means for completing the drying operation by evaporation. This means may now be described as follows:

Figs. 1 and 2 will disclose a compartment member which has already been designated as frame 12. This compartment is composed of suitable frame elements to which are attached sheet members, as 187 which, together with a door 198, forms the front of the cabinet, 188 and 189 forming two sides, 190 forming the back, 191 the top and 192 the bottom or floor. The interior of the compartment is divided into upper and lower chambers by a sheet member 193 in the central portion of which is inserted a suitable blower unit 194, so disposed as to receive air from both upper and lower chambers and discharge into a ventilating stack as 195, all as shown in Fig. 2. Side sheets 187, 188, 189 and 190 are provided with louvers as shown to admit air into the upper chamber. Arrows indicate the flow of air, which is obviously discharged by the blower 194 into the stack 195, the discharged air being replaced through the louvers as shown.

Fig. 2 will indicate that a duct 196 connects the lower chamber of frame 12 with a similar chamber of frame 11 and that a similar duct connects the latter chamber with the compartment of frame 10. The intent of the described arrangement of ducts and the divided intake of blower 194 is to provide suitable ventilation for the several chambers mentioned in order that any gases arising from leaked or spilled liquid may be taken up by the blower and discharged through the stack 195.

Near the ceiling of the frame 12 compartment are shown horizontal rails as 197, which are adapted to receive garments or hanging appliances as shown. The utility of the above described assembly will be explained later.

Referring to the left hand compartment shown in Fig. 2, designated as frame 10, it will be noted that three tanks 199, 200 and 201 are so disposed and supported therein as to be enclosed by the casing sheets of frame 10. Tank 199 is shown as having a suitably covered manhole opening as 202, tank 200 as being a sealed vessel and tank 201 having a removable cover as 203.

Referring to frame 11, it will be noted that a reservoir designated as 11', adapted to retain liquids, is formed by the side housing sheets of the compartment and a floor member 206. Reservoir 11' is provided with pipe connections which will be referred to shortly.

Figs. 2, 5 and 6 will disclose a rotary pump 207 affixed to the building floor and adapted to be driven by motor 44 through a belt 208, as shown.

Figure 3:
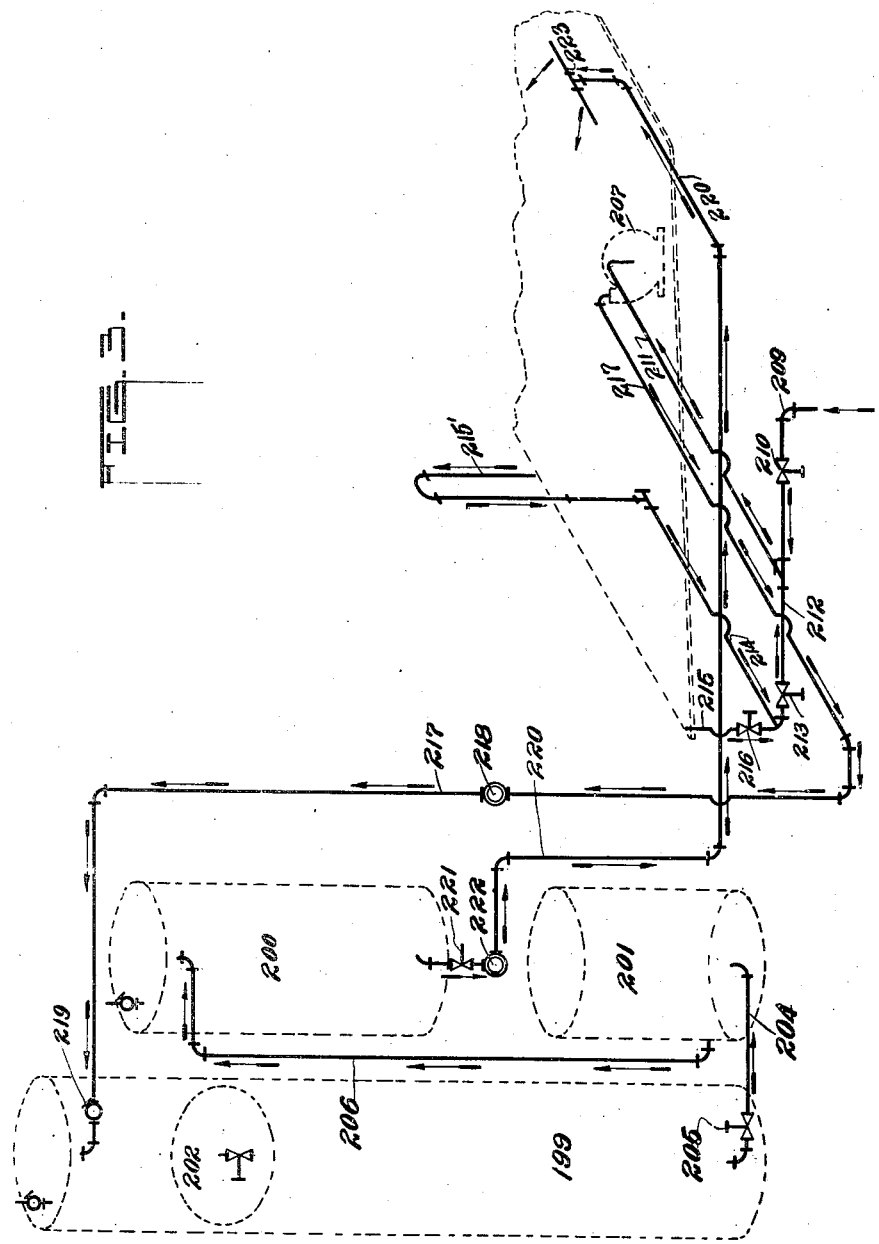
Fig. 3 is a diagrammatic view of the fluid circulating system.

The function of pump 207 is to circulate liquids through the several pipe lines and tanks as follows: Figs. 2, 3 and 5 will best illustrate a line 209 having an open end adapted to receive a hose coupling and a hand valve 210. Line 209 connects with line 211 leading to intake of pump 207, also with line 212 having a valve 213. Line 212 connects with line 214 which terminates in a siphon head 215' disposed within the fluid reservoir 11' also with line 215 having a valve 216. Line 215 terminates in the bottom of reservoir 11'.

From the discharge side of pump 207, a line 217 having a glass faced observation port 218 and a check valve 219 terminates in the upper portion of tank 199. From the lower portion of tank 200 a line 220 having a valve 221 and an observation port 222 leads into reservoir 11' and terminates in a spray head 223.

The foregoing will illustrate that, with pump 207 running, valves 213 and 216 closed and valves 210, 205 and 221 open, a supply of of liquid may be passed into the system through connection at line 209, line 211 to pump 207, line 217, tank 199, line 204, tank 201, line 206, tank 200, line 220 into reservoir 11'.

A suitable supply having been passed, continuous circulation of liquid, within the system, may be maintained by closing valve 210 and opening valves 213 and 216, when liquid will pass from reservoir 11' of frame 11 through line 215, line 212 and line 211 to pump 207 and therefrom through the system already described to the reservoir through spray head 223.

It will be apparent that, with valve 210 closed as above, and valves 213 and 216 open, liquid may flow to pump 207 from the bottom of reservoir 11' through line 215. It will also be clear that with pump 207 inactive and valves 210, 213 and 216 open, the system may be drained through the open end of line 209.

In practical use, it is necessary that the level of liquid in the reservoir 11' be maintained at a predetermined height. This is accomplished by means of the siphon head 215 through line 214, as follows: Fig. 5 will best disclose that with valves 210 and 216 closed and valve 213 open, the siphon arrangement is adapted to take liquid from the lower portion of reservoir 11' and discharge to pump 207 through lines 214, 212 and 211. A vent hole 224 is adapted to admit air to break the siphon when the level of liquid reaches a point below the elbow, as shown.

Thus, with pump 207 active, a predetermined quantity of liquid is maintained in reservoir 11' and continuous circulation of liquid through the system, as described, is provided.

For the purpose of observing the state of purity of the liquid as it leaves reservoir 11' and after having passed through the purifying means, which is here represented by tanks 199, 200 and 201, the observation ports 218 and 222 are provided, the former located in line 217 which conducts liquid from reservoir 11' to the purifying means, the latter located in line 220 which conducts liquid from the purifying means to reservoir 11'. Obviously, observation at the two ports will indicate the relative purity of the contaminated and purified streams.

The mechanism of this cleaning machine having been described, it will now be in order to describe the exterior features of the cabinets of frames 10, 11 and 12, as utilized in the practical operation of the machine.

The front of frame 10 is provided with two doors 225 and 226, the former giving access to manhole 202 in tank 199, the latter giving access to tank 201. Observation ports 218 and 222 are conveniently disposed above door 226, as shown.

The front of frame 11 is provided with a hinged cover 227 giving access to the several underlying valves and charging nozzle of line 209 already described. Near the central portion of the cabinet are two sliding doors adapted to slide in opposite directions to form an opening which will register with the central opening in drum 14 when the latter is in elevated position. Manual control levers 158, 68 and 102, already described, are conveniently disposed upon the upper portion of the cabinet, as shown.

The front of frame 12 is provided with a door 198 of suitable dimensions to permit convenient handling of garments as will be described. With motor 44 and blower 194 running, a suitable supply of cleaning fluid may be provided through the open end of pipe line 209 by means described. Any fluid leaked or spilled during the filling operation is quickly evaporated and the resulting gases discharged into stack 195 through the blower 194. Thus offensive or poisonous gases are prevented from escaping into the room.

When a sufficient supply of fluid has been obtained to properly fill the circulating system and also reservoir 11' to a suitable depth, the machine may be operated as follows:

With drum 14 in elevated position, at which position cover 16 of drum 14 will register with sliding doors 228 and all operating means disengaged, which latter condition may be indicated by a vertical position of hand levers 158, 68 and 102, as shown in Fig. 1, cover 16 of drum 14 is accessible through doors 228 as described. Operator removes cover 16 and places garments to be cleaned in drum 14, after which cover 16 is replaced and locked by manipulation of hand lever 19. After replacing cover 16, the operator next manipulates hand lever 68, for example toward the right, which will result in engagement of clutch member 38, for example, with gear 35 to rotate screw 28 in proper direction to lower drum 14 into immersion in cleaning fluid in reservoir 11' approximately as shown in Fig. 2.

Downward travel of drum 14 to a stop in proper position and return of hand lever 68 to normal vertical position is automatically accomplished by means of the forked bracket 231 contacting with collar 229 on rod 74, as described. When drum 14 reaches the lower limit of its travel, roller 115 will be out of contact with cam 116, which relation will permit manipulation by the operator of hand lever 158 to engage clutch member 88 with gear 86. Such manipulation will result in alternating rotation of drum 14 by the means described. Obviously, alternating rotation of drum 14 in the cleaning fluid will agitate the contained garments in contact with the liquid.

After the garments have been thus agitated for a suitable length of time, the operator may manipulate hand lever 68 for example toward the left, which will result in rotation of screw 28 to elevate drum 14. Slight upward movement of the drum, together with roller 115, will result in engagement of roller with cam 116 and described movement of bar 111 and lever 110 to rotate cam 109 as described, with consequent disengagement of clutch member 88 and stoppage of alternating rotation and return of hand lever 158 to normal vertical position.

Upward movement of drum 14 will progress until forked bracket 231 engages with collar 230 on rod 74, which will result in vertical movement of rod and consequent disengagement of the elevating means described and return of hand lever 68 to normal vertical position.

When drum 14 has reached the upper limit of its travel, the cover 16 will register with doors 228, as mentioned, also shoulder 171 of lever 170 is in a position of contact with cam 176, whereby lever 170 has been displaced to withdraw tooth 172 to unlock cam 167, as described, making possible the manipulation of hand lever 102 toward, for example, the right of its normal vertical position. Such manipulation of hand lever 102 will result in engagement of clutch member 136 with female member 135 resulting in low speed continuous rotation of drum 14 as described. The said low speed rotation assists to overcome inertia of drum 14, also permits the cleaned garments to fall loosely about in the drum, resulting in a substantially uniform distribution of garments in the drum.

After drum 14 has attained a suitable initial speed, hand lever 102 is manipulated across center toward the left, which will result in disengaging clutch 136 with female member 135 and engagement with female member 134, which engagement will place drum 14 in higher speed ratio, which will result in sufficiently high speed of rotation to extract substantially all of the contained fluid by centrifugal action.

When the spinning operation has been sufficiently carried out, rotation is discontinued by manipulation of hand lever 102 to normal vertical position.

It has already been noted that when drum 14 is in elevated position, cover 16 of the drum is in register with doors 228. Doors 228 may now be opened, cover 16 removed and garments removed from the drum.

To complete the drying operation, the garments are loosely hung in the upper chamber of frame 12, where the fluid remaining in them is evaporated and discharged into stack 195 by the action of air induced through louvers in the upper portion of the chamber 12 by the blower 194.

Details of operation of the several mechanisms having been described, commercial operation may be summarized as follows: Garments are placed in drum 14, drum 14 is lowered into fluid contained in the reservoir 11'. Drum 14 is placed in alternating rotation to agitate garments in contact with the fluid. Drum 14 is then elevated to be placed in continuous rotation, first in low gear then in high gear to facilitate extraction of fluid. Garments are then removed from the drum 14 and placed in the chamber of frame 12 to be dried by evaporation.

During the cleaning operation described, the cleaning fluid has been continuously circulated through the purifying means as described. Thus dirt, grease, etc. removed from the garments is continuously being removed from the liquid so that garments are at all times in contact with substantially clean fluid. Ports 218 and 222 furnish a convenient means for observing the condition of the fluid.

A complete embodiment of my invention having now been described, it may be in order to describe a variation in mechanism for effecting continuous rotation of drum 14, which mechanism may replace that shown and described principally in Fig. 7. The function of this mechanism is identical with that already described.

For the purpose of illustration, shaft 22 carrying drum 14 and associated mechanism may be considered identical with that previously described with the exception that the outer end of shaft is mounted in a ball bearing 250 which is supported upon elevator frame 25 by means of a frame member 251. The ball bearing 250 replaces the bearing 23 shown in Fig. 7.

Supporting means for the mechanism shown in Fig. 26 is provided by a frame and housing member 252, affixed to member 251, together with a cover member 253 which is affixed to member 252 as shown, the whole being suitably secured to the elevator frame 25.

The view shown in Fig. 26 will disclose that shaft 22 extends somewhat beyond bearing 250 and has a circular cavity formed in the outer end which, being suitably bushed, forms a bearing 254 adapted to rotatably support the contracted end of a stub shaft 255, which latter is journalled at its outer end in a bearing 256 supported in frame member 253.

Stub shaft 255 is provided, in the portion adjacent to bearing 254 with gear teeth forming a pinion 258 which is best shown in Fig. 30. Pinion 258 is adapted to form the central element of a differential train comprising the said pinion, two intermediate gears 259 and an internal gear member 260.

Gears 259 are rotatably mounted upon studs 261 which are affixed in a yoke member 257. Yoke 257 is secured to the end of shaft 22, as best shown in Fig. 26.

Internal gear 260 is supported in a frame comprising a back plate member 263 which is rotatably supported upon shaft 22, as shown, and a front plate member 264, which is rotatably supported upon stub shaft 255. Internal gear 260 is secured between plates 263 and 264 by means of bolts 265, the whole forming a supporting frame for gear 260, which frame, it will be noted, is rotatably supported, on one side by shaft 22 and on the opposite side by stub shaft 255.

It will be noted that bolts 265 have elongated heads which are adapted to carry loosely mounted clutch plate members 266 which are interleaved with complementary plates 267, as shown, the latter being loosely supported upon studs 268' which are secured in a plate member 268. Member 268 is slidably keyed to stub shaft 255. A thrust collar member 269, abutting washers 271 is rotatably mounted upon stub shaft 255 and is urged, by a spring 270, abutted by bearing fixture 256, to slide plate 268 toward plate 264 and thereby bring plates 267, rotatable in unison with plate 268, into frictional contact with plates 266 which are rotatable in unison with back plate 264. The utility of this assembly will be explained shortly.

Referring to the plate 263, gear 260 and plate 264 assembly, it will be noted that the peripheral face of this unit is finished so as to adapt it to function as a brake drum which will be designated herein by the numeral 272.

Figs. 29 and 30 will disclose that drum 272 is surrounded by a brake band 273 which is suitably supported by means of slip members 275 and 276, upon a contracted portion 274 of a screw member 277 which is suitably mounted in structure 252, as shown.

A tubular plunger member 278 having a roller 278' suitably mounted in its upper end, is slidably mounted in structure 252 and telescoped over the screw portion 274.

Clip 275 is abutted by a shoulder portion of screw 277, while clip 276 is abutted by the slidable plunger 278. A compression spring 279 reacts to retain clips 275 and 276 in contact with the abutment members mentioned and also to spread the clips to normally retain brake band 273 out of frictional contact with drum 272. Plunger 278 being slidable in structure 252 and upon screw portion 274, is adapted, when propelled downwardly, to move clips 276 along screw portion 274 and thus contract brake band 273 to bring it into frictional contact with drum 272.

In connection with the rotating mechanism previously described herein and especially referred to in Fig. 7, I have explained that manual operation of the clutching mechanism is accomplished through rotation of a vertical shaft 164, which means is similarly used to effect operation of the clutching devices described in the present arrangement as follows:

As best shown in Fig. 27, thrust collar 269 is trunnioned on either side in such a manner as to be slid upon shaft 225 by means of a double lever member 280 which is affixed to a vertical shaft 281. Shaft 281 is rotatably mounted in suitable bearings formed in structure 252 and has a lever member 282 secured to its outer end as shown. Lever 282 carries a suitably mounted roller at its free end, which is adapted to rest in contact with the peripheral face of a cam member 283. Cam 283 is mounted upon a vertical shaft 284 which is suitably supported upon elevator frame 25 and adapted to be rotated by means similar to those used in connection with vertical shaft 164.

Figs. 26 and 29 will illustrate that cam 283 is so disposed with relation to plunger 278 that roller 278', as urged by spring 279, contacts with its under surface which is so formed that when cam 283 is rotated, vertical movement is imparted to plunger 278. Due to the form of the under surface of cam 283 and the form of its peripheral face as contacted by the roller of lever 282, rotation of the cam in a clockwise direction as in Figs. 26 and 28 will result in downward movement of plunger 278 and contraction of brake band 283 about brake drum 272 and withdrawal of collar 269 from contact with washers 271 and plate 268, whereas, return rotation of the cam to the position shown in Figs. 26 and 28 will result in upward movement of plunger 278 to release brake band 273 from drum 272 and movement of levers 282 and 280 to permit spring 270 to propel collar 269 and associated parts to bring about frictional contact between plates 266 and 267. Obviously, with cam 283 in position intermediate its extremes of rotation, both plunger 278 and collar 269 will be retained in an open position, in other words, a position where brake band 273 is free of drum 272 and plates 266 are not in frictional contact with plates 267.

Power for rotating shaft 22 through the foregoing mechanism is transmitted by means which include a sprocket 284' secured to plate 268 as shown, which sprocket carries a chain 285 meshing with a sprocket 286. Sprocket 286 is secured to a countershaft 287 which is rotatably mounted in bearings 288 and 289, the former formed in structure 252 and the latter in cover member 253.

Secured to the extending end of shaft 287 is a sprocket 290 carrying a chain 291 meshing with a sprocket 292. Sprocket 292 is secured to a shaft 293 which shaft, it may be noted here, corresponds to shaft 129 mentioned in the previous description.

Shaft 293 is rotably mounted in bearings 294 and 295 formed in a structure 296, which structure is supported upon structure 252 by means of an arm or bracket member 297. A sprocket 298 is secured to shaft 293 which latter carries upon its outer ends rotatably mounted links 299.

As best shown in Fig. 27, sprocket 298 carries a chain 300 which meshes with a sprocket 301.

Since shaft 293 and sprocket 298 correspond to shaft 129 and pulley 137, and links 299, chain 300 and sprocket 301 correspond to links 144, belt 138 and pulley 139 of the previous description, it is thought unnecessary to describe them further than to say that they provide means for transmitting power from motor 44 to shaft 22.

Operation of the above mechanism may be described as follows:

With motor running, the several parts, including stub shaft 255 rotating and drum 14 in elevated position as previously described, hand lever 158 is manipulated from normal vertical position toward, for example, the right which movement will result in clockwise rotation of cam 283 to contract brake band 273 upon drum 272, thus arresting possible rotation of internal gear 260. With gear 260 locked against rotation, rotation of pinion 258 will impart corresponding rotation to intermediate gears 259 to rotate yoke 257 and shaft 22 at a comparatively low rate of speed.

After shaft 22, with drum 14, has attained a suitable rotational speed, hand lever 158 is manipulated toward the left to rotate cam 283 counter-clockwise to the position shown in Fig. 26, to release brake band 273 and engage plates 266 with plates 267, by means described, to impart unitary rotation of internal gear 272 with pinion 258 thereby causing gears 259 to act as coupling means to impart unitary rotation of yoke 257 and shaft 22 with sprocket 284 to rotate drum 14 at a comparatively high rate of speed.

What I claim is:

1. A cleaning and drying unit comprising a receptacle for cleaning fluid, a horizontally disposed perforated container within said receptacle, means for imparting movement to said container to accomplish the cleaning operation, means for causing relative translating up and down movement between said container and said receptacle from a washing to an extracting position, and means for extracting the cleaning fluid from the material within the container by moving the container in a continuous rotational manner while in an extracting position, said container in extracting position having its axis in a substantially horizontal plane.

2. A cleaning and drying unit comprising a receptacle for cleaning fluid, a horizontally disposed open ended perforated container within said receptacle, means for imparting movement to said container to accomplish the cleaning operation, means for causing relative translating up and down movement between said container and said receptacle from a washing to an extracting position, and means for extracting the cleaning fluid from the material within the container by moving the container in a continuous rotational manner while in an extracting position, said container in extracting position having its axis in a substantially horizontal plane.

3. A cleaning and drying unit comprising a receptacle for cleaning fluid, an open ended clothes container mounted within said receptacle, means for raising said container above the cleaning fluid within the receptacle, means for imparting a reciprocatory movement to said container while in its lower position, and means for imparting a high speed rotary movement to said container while in its raised or extracting position, said container in its extracting position having its axis in a substantially horizontal plane.

4. A cleaning and drying unit comprising a receptacle for cleaning fluid, an open ended perforated clothes container mounted within said receptacle with its axis in a horizontal plane, means for imparting a washing movement to said container, a driving means for imparting a slow rotary movement to said container to permit material within said container to become evenly distributed, and means for rotating said container at a high rate of speed for removing all cleaning fluid from the material.

5. A cleaning and drying unit comprising a receptacle for cleaning fluid, an open ended perforated container mounted within said receptacle with its axis in a horizontal plane, means for imparting movement to said container to accomplish the cleaning operation, means for causing relative up and down translating movement between said container and said receptacle from a washing to an extracting position, a driving means operative when said container is in extracting position for imparting a slow rotary movement to said container to permit material within said container to become evenly distributed, and means for rotating said container at a high rate of speed for removing all cleaning fluid from the material.

6. A cleaning and drying unit comprising a receptacle for cleaning fluid, a perforated clothes container mounted in said receptacle, means for causing relative translating up and down movement between said container and said receptacle from a washing to an extracting position, driving means for imparting movement to said container for accomplishing the cleaning operation, driving means for imparting a rotary movement to said container when in its extracting position, a safety control means for said two mentioned driving means for preventing the operation of the first mentioned driving means when the container is in extracting position and for preventing the operation of the second mentioned driving means when the container is in cleaning position.

7. A cleaning and drying unit comprising a receptacle for cleaning fluid, a perforated open ended clothes container mounted in said receptacle, means for causing relative translating up and down movement between said container and said receptacle from a washing to an extracting position, driving means for imparting movement to said container for accomplishing the cleaning operation, driving means for imparting a rotary movement to said container when in its extracting position, a safety control means for said two mentioned driving means for preventing the operation of the first mentioned driving means when the container is in extracting position and for preventing the operation of the second mentioned driving means when the container is in cleaning position.

8. A cleaning and drying unit comprising a receptacle for cleaning fluid, a horizontally disposed perforated container within said receptacle, means for imparting movement to said container to accomplish the cleaning operation, means for causing relative translating up and down movement between said container and said receptacle from a washing to an extracting position, means for guiding said relative translating movement between said container and said receptacle, and means for extracting the cleaning fluid from material within the container by moving the container in a continuous rotational manner while in an extracting position, said container in extracting position having its axis in a substantially horizontal plane.

9. A cleaning and drying unit including in combination a receptacle for cleaning fluid, an open ended perforated basket suspended in a horizontal manner within said chamber, a carriage supporting the horizontal axis of the basket, a power driven reciprocating member operatively connected to the horizontal axis of said basket, a clutch for said reciprocating mechanism and controlling the agitational movement of the basket when submerged in the cleaning fluid, a power driven elevating member operatively associated with the carriage for moving the basket and carriage in an upward and downward manner, a clutch for controlling said elevating member, a continuous driving means operatively connected to the horizontal shaft of the perforated basket when in an elevated position and a clutch controlling the operative engagement of the continuous driving connection with the horizontal shaft.

In testimony whereof I have hereunto affixed my signature.

JOHN W. CHAMBERLIN.